(12) United States Patent
Kwon

(10) Patent No.: US 12,487,513 B2
(45) Date of Patent: Dec. 2, 2025

(54) ELECTRONIC DEVICE AND CONTROL METHOD THEREOF

(71) Applicant: SAMSUNG ELECTRONICS CO., LTD., Suwon-si (KR)

(72) Inventor: Ohyun Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 583 days.

(21) Appl. No.: 17/851,556

(22) Filed: Jun. 28, 2022

(65) Prior Publication Data

US 2023/0059482 A1   Feb. 23, 2023

Related U.S. Application Data

(63) Continuation of application No. PCT/KR2022/004722, filed on Apr. 1, 2022.

(30) Foreign Application Priority Data

Aug. 23, 2021   (KR) .................. 10-2021-0111037

(51) Int. Cl.
*G03B 21/14*      (2006.01)
*G03B 21/53*      (2006.01)
*G10L 15/22*      (2006.01)

(52) U.S. Cl.
CPC ........... *G03B 21/147* (2013.01); *G03B 21/53* (2013.01); *G10L 15/22* (2013.01); *G10L 2015/223* (2013.01)

(58) Field of Classification Search
CPC ....... G03B 21/147; G03B 21/53; G10L 15/22; G10L 2015/223; G06F 3/167; H04N 9/31; H04N 21/41; H04N 21/422; H04N 21/45; H04N 9/3185; H04N 9/3188; H04N 21/4122; H04N 21/42203; H04N 21/4524
(Continued)

(56) References Cited

U.S. PATENT DOCUMENTS 8,269,902 B2   9/2012   Plut
8,491,127 B2   7/2013   Wang
(Continued)

FOREIGN PATENT DOCUMENTS

CN   112106016 A   12/2020
JP   2005-241971   9/2005
(Continued)

OTHER PUBLICATIONS

International Search Report dated Jul. 15, 2022 for International Application No. PCT/KR2022/004722.
(Continued)

*Primary Examiner* — Magda Cruz
(74) *Attorney, Agent, or Firm* — STAAS & HALSEY LLP

(57) ABSTRACT

An electronic device and a control method thereof are provided. The control method of an electronic device includes: acquiring first location information on a projection area of an image projected by the electronic device through a sensor; acquiring second location information on a location where a user is located, through the sensor; and performing at least one of an operation corresponding to a voice input of the user or an operation corresponding to image quality processing based on the first location information and the second location information.

13 Claims, 20 Drawing Sheets

(58) Field of Classification Search
USPC .......................................................... 353/69
See application file for complete search history.

(56) References Cited

U.S. PATENT DOCUMENTS

| | | | |
|---|---|---|---|
| 9,020,825 | B1 | 4/2015 | Garber |
| 9,596,441 | B2 | 3/2017 | Shin |
| 10,930,249 | B2 | 2/2021 | Ida et al. |
| 11,003,062 | B2 | 5/2021 | Takahashi et al. |
| 11,284,047 | B2 | 3/2022 | Ikeda et al. |
| 2015/0189248 | A1 | 7/2015 | Shin |
| 2017/0374331 | A1 | 12/2017 | Liu et al. |
| 2019/0121522 | A1* | 4/2019 | Davis ................ G06V 40/28 |
| 2020/0090654 | A1 | 3/2020 | Shin et al. |
| 2020/0105258 | A1 | 4/2020 | Lin et al. |
| 2020/0228763 | A1 | 7/2020 | Ikeda et al. |
| 2021/0110790 | A1 | 4/2021 | Shigeta et al. |
| 2021/0247668 | A1* | 8/2021 | VanBlon ............ H04N 9/3147 |

FOREIGN PATENT DOCUMENTS

| | | |
|---|---|---|
| JP | 4480387 B2 | 6/2010 |
| JP | 2011-118124 | 6/2011 |
| JP | 2012-529223 A | 11/2012 |
| JP | 2019-36181 | 3/2019 |
| JP | 6680294 B2 | 4/2020 |
| KR | 10-2004-0056489 | 7/2004 |
| KR | 10-2008-0075640 | 8/2008 |
| KR | 10-2015-0080678 | 7/2015 |
| KR | 10-2018-0126946 | 11/2018 |
| KR | 20-0490714 | 12/2019 |

OTHER PUBLICATIONS

Written Opinion of the International Searching Authority dated Jul. 15, 2022 for International Application No. PCT/KR2022/004722.

Extended European Search Report issued Sep. 24, 2024 for European Patent Application No. 22861501.9.

Examination Report dated Jun. 25, 2025 for European Patent Application No. 22861501.9.

Office Action dated Oct. 2, 2025 issued by the Korean Patent Office for Korean Patent Application No. 10-2021-0111037.

* cited by examiner

ELECTRONIC DEVICE AND CONTROL METHOD THEREOF

CROSS-REFERENCE TO RELATED APPLICATION(S)

This application is a continuation application, under 35 U.S.C. § 111(a), of International Application No. PCT/KR2022/004722, filed on Apr. 1, 2022, which is based on and claims priority under 35 U.S.C. § 119 to Korean Patent Application No. 10-2021-0111037, filed on Aug. 23, 2021, in the Korean Intellectual Property Office, the disclosures of which are incorporated by reference herein in their entirety.

BACKGROUND

1. Field

Apparatuses and methods consistent with the disclosure relate to an electronic device that projects a projected image, and a control method thereof, and more particularly, to an electronic device that performs an operation based on a location of a user, and a control method thereof.

2. Description of Related Art

With the development of technology, electronic devices having various optical output functions have been developed, and examples of these electronic devices may include a display device, an illumination device, a portable communication device, and a projector. Among them, the projector is an electronic device that enlarges and projects output light output from a light source on a wall or a screen through a projection lens.

Accordingly, a conventional projector may not provide an operation suitable for a location of a user by performing an operation corresponding to a simple voice input of the user centered on the projector or a remote control and an operation corresponding to image quality processing without considering an actual viewing location of the user.

SUMMARY

The disclosure provides an electronic device that performs at least one of an operation corresponding to a voice input of a user and an operation corresponding to image quality processing based on a location of the user, and a control method thereof.

According to an embodiment of the disclosure, a control method of an electronic device includes: acquiring first location information on a projection area of an image projected by the electronic device through a sensor; acquiring second location information on a location where a user is located, through the sensor; and performing at least one of an operation corresponding to a voice input of the user and an operation corresponding to image quality processing based on the first location information and the second location information.

The control method may further include: identifying information on a relative location between the projection area, the electronic device, and the user based on the first location information and the second location information; and performing the operation corresponding to the voice input of the user based on the information on the relative location.

The performing of the operation corresponding to the voice input of the user may include: performing a first operation corresponding to the voice input of the user when it is identified that the user is located between the electronic device and the projection area through the information on the relative location; and performing a second operation corresponding to the voice input of the user when it is identified that the electronic device is located between the user and the projection area through the information on the relative location.

The performing of the first operation may include: performing, when the voice input of the user is received, pre-processing on the received voice input of the user to acquire voice information; and performing the operation corresponding to the voice input of the user based on the voice information.

The performing of the second operation may include controlling an external device so that the external device for controlling the electronic device performs the operation corresponding to the voice input of the user, when a trigger voice input of the user is received.

The performing of the second operation may include identifying a device that is to perform the operation corresponding to the voice input of the user, of the electronic device and an external device, based on the second location information and location information received from the external device for controlling the electronic device, when a trigger voice input of the user is received.

The control method may further include performing a keystone function of the electronic device when the user deviates from a predetermined viewing angle with respect to the projection area through the information on the relative location.

The control method may further include: acquiring information on a distance between the projection area and the user based on the first location information and the second location information; and performing at least one of an operation of adjusting a focus of an image projected on the projection area and an operation of correcting the image based on the information on the distance.

In the acquiring of the second location information, the second location information may be acquired by further using location information received from an external device for controlling the electronic device.

According to another embodiment of the disclosure, an electronic device includes: a projection part configured to project a projected image; a sensor part; a memory configured to store at least one instruction; and a processor configured to execute the at least one instruction stored in the memory to control the electronic device, wherein the processor is configured to: acquire first location information on a projection area of the image projected by the projection part through the sensor part, acquire second location information on a location where a user is located, through the sensor part; and perform at least one of an operation corresponding to a voice input of the user and an operation corresponding to image quality processing based on the first location information and the second location information.

The processor may be configured to: identify information on a relative location between the projection area, the electronic device, and the user based on the first location information and the second location information, and perform the operation corresponding to the voice input of the user based on the information on the relative location.

The processor may be configured to: perform a first operation corresponding to the voice input of the user when it is identified that the user is located between the electronic device and the projection area through the information on the relative location, and perform a second operation corresponding to the voice input of the user when it is identified that the electronic device is located between the user and the projection area through the information on the relative location.

The processor may be configured to: perform, when it is identified that the user is located between the electronic device and the projection area and the voice input of the user is received, pre-processing on the received voice input of the user to acquire voice information, and perform the operation corresponding to the voice input of the user based on the voice information.

The processor may be configured to: control an external device so that the external device for controlling the electronic device performs the operation corresponding to the voice input of the user, when it is identified that the electronic device is located between the user and the projection area and a trigger voice input of the user is received.

The processor may be configured to: identify a device that is to perform the operation corresponding to the voice input of the user, of the electronic device and an external device, based on the second location information and location information received from the external device for controlling the electronic device, when a trigger voice input of the user is received.

The processor may be configured to: perform a keystone function of the electronic device when the user deviates from a predetermined viewing angle with respect to the projection area through the information on the relative location.

The processor may be configured to: acquire information on a distance between the projection area and the user based on the first location information and the second location information; and perform at least one of an operation of adjusting a focus of an image projected on the projection area and an operation of correcting the image based on the information on the distance.

The processor may be configured to: acquire the second location information by further using location information received from an external device for controlling the electronic device.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

According to the diverse embodiments as described above, the electronic device may provide an image suitable for an actual location of the user by performing an operation in consideration of the location of the user. In addition, the electronic device may effectively perform an operation corresponding to the voice input of the user in consideration of the location of the user.

Figure 1:
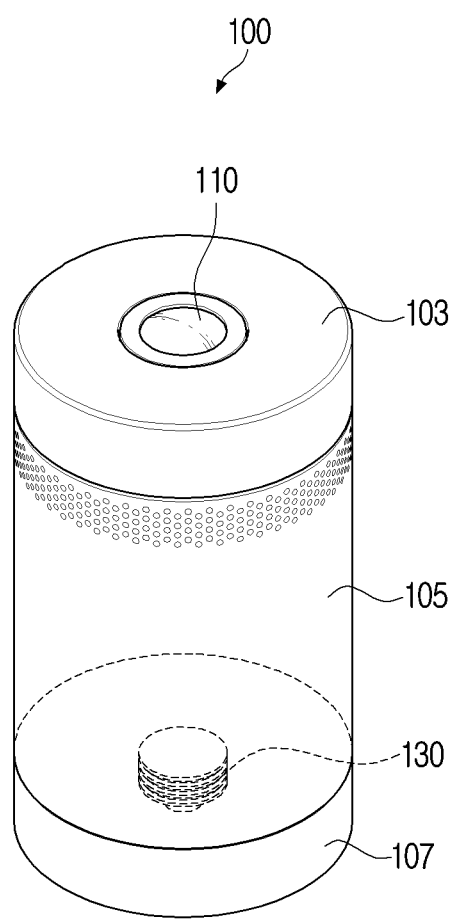
FIG. 1 is a perspective view illustrating an exterior of an electronic device according to an embodiment of the disclosure.

FIG. 1 is a perspective view illustrating an exterior of an electronic device 100 according to an embodiment of the disclosure.

Referring to FIG. 1, the electronic device 100 may include a head 103, a main body 105, a projection lens 110, a connector 130, or a cover 107.

The electronic device 100 may be devices in various forms. In particular, the electronic device 100 may be a projector device that enlarges and projects an image to a wall or a screen, and the projector device may be an LCD projector or a digital light processing (DLP) type projector that uses a digital micromirror device (DMD).

Also, the electronic device 100 may be a display device for households or for an industrial use. Alternatively, the electronic device 100 may be an illumination device used in everyday lives, or an audio device including an audio module, and it may be implemented as a portable communication device (e.g.: a smartphone), a computer device, a portable multimedia device, a wearable device, or a home appliance, etc. Meanwhile, the electronic device 100 according to an embodiment of the disclosure is not limited to the aforementioned devices, and the electronic device 100 may be implemented as an electronic device 100 equipped with two or more functions of the aforementioned devices. For example, according to a manipulation of a processor, a projector function of the electronic device 100 is turned off, and an illumination function or a speaker function is turned on, and the electronic device 100 may be utilized as a display device, an illumination device, or an audio device. Also, the electronic device 100 may include a microphone or a communication device, and may be utilized as an AI speaker.

The main body 105 is a housing constituting the exterior, and it may support or protect the components of the electronic device 100 (e.g., the components illustrated in FIG. 2) that are arranged inside the main body 105. The shape of the main body 105 may have a structure close to a cylindrical shape as illustrated in FIG. 1. However, the shape of the main body 105 is not limited thereto, and according to the various embodiments of the disclosure, the main body 105 may be implemented as various geometrical shapes such as a column, a cone, a sphere, etc. having polygonal cross sections.

The size of the main body 105 may be a size that a user can grip or move with one hand, and the main body 105 may be implemented as a micro size so as to be easily carried, or it may be implemented as a size that can be held on a table or that can be coupled to an illumination device.

Also, the material of the main body 105 may be implemented as a matt metallic or synthetic resin such that a user's fingerprint or dust does not smear it. Alternatively, the exterior of the main body 105 may consist of a slick glossy material.

In the main body 105, a friction area may be formed in a partial area of the exterior of the main body 105 such that a user can grip and move the main body 105. Alternatively, in the main body 105, a bent gripping part or a support 108a (refer to FIG. 3) that can be gripped by a user may be provided in at least a partial area.

The projection lens 110 is formed on one surface of the main body 105, and is formed to project a light that passed through a lens array to the outside of the main body 105. The projection lens 110 according to the various embodiments of the disclosure may be an optical lens which was low-dispersion coated for reducing chromatic aberration. Also, the projection lens 110 may be a convex lens or a condensing lens, and the projection lens 110 according to an embodiment of the disclosure may adjust the focus by adjusting locations of a plurality of sub lenses.

The head 103 may be provided to be coupled to one surface of the main body 105, and it can support and protect the projection lens 110. Also, the head 103 may be coupled to the main body 105 so as to be swiveled within a predetermined angle range based on one surface of the main body 105.

The head 103 may be automatically or manually swiveled by a user or the processor, and it may freely adjust a projection angle of the projection lens 110. Alternatively, although not illustrated in the drawings, the head 103 may include a neck that is coupled to the main body 105 and that extends from the main body 105, and the head 103 may adjust a projection angle of the projection lens 110 as it is tipped or tilted.

The electronic device 100 may project a light or an image to a desired location by adjusting an emission angle of the projection lens 110 while adjusting the direction of the head 103 in a state wherein the location and the angle of the main body 105 are fixed. Also, the head 103 may include a handle that a user can grip after rotating in a desired direction.

On an outer circumferential surface of the main body 105, a plurality of openings may be formed. Through the plurality of openings, audio output from an audio output part may be output to the outside of the main body 105 of the electronic device 100. The audio output part may include a speaker, and the speaker may be used for general uses such as reproduction of multimedia or reproduction of recording, output of a voice, etc.

According to an embodiment of the disclosure, a radiation fan (not shown) may be provided inside the main body 105, and when the radiation fan (not shown) is operated, air or heat inside the main body 105 may be discharged through the plurality of openings. Accordingly, the electronic device 100 may discharge heat generated by the driving of the electronic device 100 to the outside, and prevent overheating of the electronic device 100.

The connector 130 may connect the electronic device 100 with an external device and transmit or receive electronic signals, or it may be supplied with power from the outside. The connector 130 according to an embodiment of the disclosure may be physically connected with an external device. Here, the connector 130 may include an input/output interface, and it may connect communication with an external device, or it may be supplied with power via wire or wirelessly. For example, the connector 130 may include an HDMI connection terminal, a USB connection terminal, an SD card accommodating groove, an audio connection terminal, or a power consent. Alternatively, the connector 130 may include a Bluetooth, Wi-Fi, or wireless charge connection module that is connected with an external device wirelessly.

Also, the connector 130 may have a socket structure connected to an external illumination device, and it may be connected to a socket accommodating groove of an external illumination device and supplied with power. The size and specification of the connector 130 of a socket structure may be implemented in various ways in consideration of an accommodating structure of an external device that can be coupled. For example, according to the international standard E26, a diameter of a joining part of the connector 130 may be implemented as 26 mm, and in this case, the electronic device 100 may be coupled to an external illumination device such as a stand in place of a light bulb that is generally used. Meanwhile, when coupled to a conventional socket located on a ceiling, the electronic device 100 has a structure of being projected from up to down, and in case the electronic device 100 does not rotate by socket-coupling, the screen cannot be rotated, either. Accordingly, in case power is supplied as the electronic device 100 is socket-coupled, in order that the electronic device 100 can rotate, the head 103 is swiveled on one surface of the main body 105 and adjusts an emission angle while the electronic device 100 is socket-coupled to a stand on a ceiling, and accordingly, the screen can be emitted to a desired location, or the screen can be rotated.

The connector 130 may include a coupling sensor, and the coupling sensor may sense whether the connector 130 and an external device are coupled, a coupled state, or a subject for coupling, etc. and transmit the information to the processor, and the processor may control the driving of the electronic device 100 based on the transmitted detection values.

The cover 107 may be coupled to or separated from the main body 105, and it may protect the connector 130 such that the connector 130 is not exposed to the outside at all times. The shape of the cover 107 may be a shape of being continued to the main body 105 as illustrated in FIG. 1. Alternatively, the shape may be implemented to correspond to the shape of the connector 130. Also, the cover 107 may support the electronic device 100, and the electronic device 100 may be coupled to the cover 107, and may be used while being coupled to or held on an external holder.

In the electronic device 100 according to the various embodiments of the disclosure, a battery may be provided inside the cover 107. The battery may include, for example, a primary cell that cannot be recharged, a secondary cell that can be recharged, or a fuel cell.

Although not illustrated in the drawings, the electronic device 100 may include a camera module, and the camera module may photograph still images and moving images. According to an embodiment of the disclosure, the camera module may include one or more lenses, an image sensor, an image signal processor, or a flash.

Also, although not illustrated in the drawings, the electronic device 100 may include a protection case (not shown) such that the electronic device 100 can be easily carried while being protected. Alternatively, the electronic device 100 may include a stand (not shown) that supports or fixes the main body 105, and a bracket (not shown) that can be coupled to a wall surface or a partition.

In addition, the electronic device 100 may be connected with various external devices by using a socket structure, and provide various functions. As an example, the electronic device 100 may be connected with an external camera device by using a socket structure. The electronic device 100 may provide an image stored in a connected camera device or an image that is currently being photographed by using a projection part 111. As another example, the electronic device 100 may be connected with a battery module by using a socket structure, and supplied with power. Meanwhile, the electronic device 100 may be connected with an external device by using a socket structure, but this is merely an example, and the electronic device 100 may be connected with an external device by using another interface (e.g., a USB, etc.).

Figure 2A:
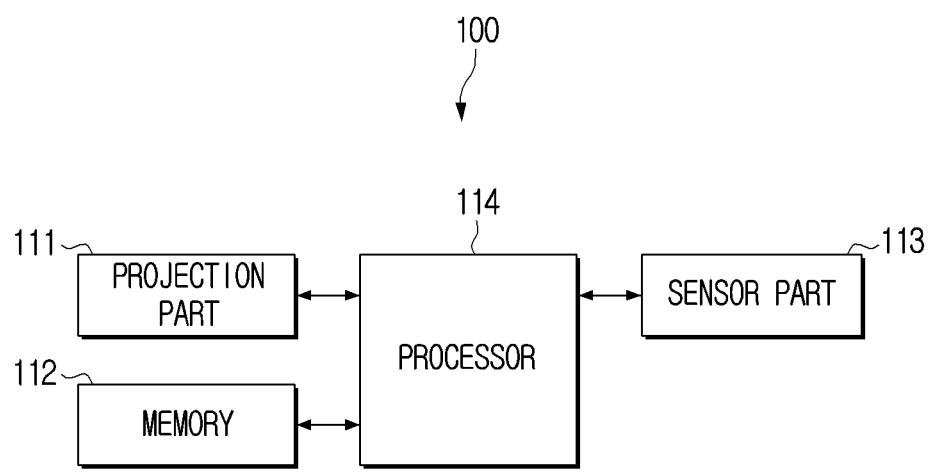
FIG. 2A is a block diagram illustrating the electronic device according to an embodiment of the disclosure.

FIG. 2A is a block diagram illustrating the electronic device according to an embodiment of the disclosure.

Referring to FIG. 2A, the electronic device 100 may include a projection part 111, a memory 112, a sensor part 113, and a processor 114.

The projection part 111 may perform a function of outputting an image to a projection surface. A detailed description related to the projection part 111 will be described with reference to FIG. 2B. Here, the projection part has been described, but the electronic device 100 may project an image in various manners. Here, the projection part 111 may include a projection lens 110. Here, the projection surface may be a portion of a physical space on which the image is output or may be a separate screen.

The memory 112 may store location information acquired through the sensor part 113. A detailed description related to the memory 112 will be described with reference to FIG. 2B.

The sensor part 113 may include at least one sensor. Specifically, the sensor part 113 may acquire location information of a user around the electronic device 100 and location information of a projection area for the image projected by the projection part 111. In an embodiment, the sensor part 113 may include a time of flight (ToF) sensor. The ToF sensor may acquire spatial information, distance information, and motion information of an object by calculating a distance at which light projected on the object is reflected and returned through an infrared wavelength.

The sensor part 113 according to the disclosure may include a plurality of ToF sensors to acquire location information on an object around 360 degrees of the electronic device 100. However, the disclosure is not limited thereto, and the sensor part 113 according to the disclosure may include a single ToF sensor. In this case, the single ToF sensor rotates by 360 degrees to acquire location information on an object around the electronic device 100.

However, according to the disclosure, the sensor part 113 may include at least one of an image sensor capturing an image, a distance sensor, or a light detection and ranging (LiDAR) sensor in addition to the ToF sensor, and may acquire location information of the projection area and location information of the user through various sensors.

The processor 114 may perform a general control operation of the electronic device 100. Specifically, the processor 114 may acquire first location information on the projection area of the image projected by the projection part 111 through the sensor part 113.

As an embodiment, the processor 114 may acquire first location information on the projection area of the image projected by the projection part 111 using the ToF sensor of the sensor part 113. In this case, the first location information may include spatial information on the projection area and distance information on the projection area. The distance information on the projection area refers to distance information between the electronic device 100 and the projection area.

In addition, the processor 114 may acquire second location information on a location where the user is located, through the sensor part 113.

As an embodiment, the processor 114 may acquire second location information on a location where the user is located, using the ToF sensor of the sensor part 113. In this case, the second location information may include spatial information on the user, distance information on the user, and motion information on the user. The distance information on the user refers to distance information between the electronic device 100 and the user.

Figure 2B:
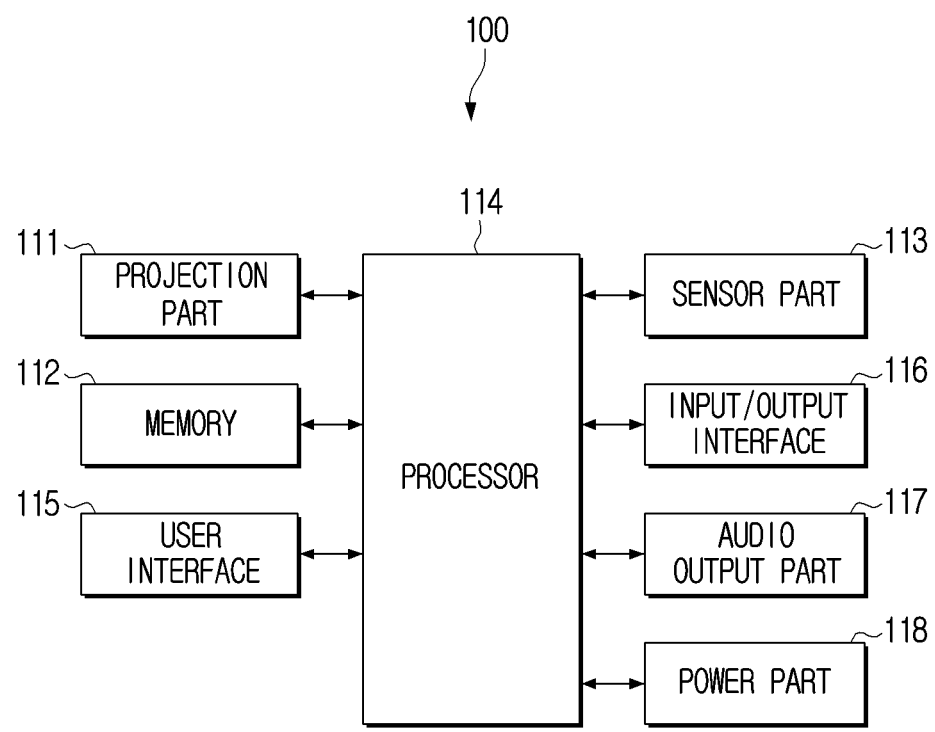
FIG. 2B is a block diagram for describing detailed components of FIG. 2A.

As an embodiment, the processor 114 may receive location information from an external device for controlling the electronic device 100 through an input/output interface 116 of FIG. 2B, and acquire second location information on a location where the user is located by further using the received location information. As an embodiment, the processor 114 may receive location information from a user terminal device through an input/output interface 116 of FIG. 2B, and acquire second location information on a location where the user is located by further using the received location information. The external device may be implemented as a remote control and a user terminal device, and an embodiment of acquiring the second location information using a plurality of external devices will be described later with reference to FIG. 14.

When the first location information and the second location information are acquired, the processor 114 may perform at least one of an operation corresponding to a voice input of a user and an operation corresponding to image quality processing based on the first location information and the second location information.

The operation corresponding to the voice input of the user may include a first operation of performing pre-processing on the received voice input of the user to perform voice recognition and a second operation of identifying a device that is to perform the operation corresponding to the voice input of the user among a plurality of devices in the premises. The operation corresponding to the image quality processing may include an operation of performing a keystone function based on the location information of the user, an operation of correcting the image projected by the projection part 111 based on the location information of the user, and an operation of adjusting a focus of the image projected by the projection part 111 based on the location information of the user. Specific embodiments of the operation corresponding to the voice input of the user and the operation corresponding to the image quality processing will be described with reference to the following drawings.

As an embodiment, the processor 114 may identify information on a relative location between the projection area, the electronic device, and the user based on the first location information and the second location information. As an example, the processor 114 may identify information on a relative location between the projection area, the electronic device, and the user based on the spatial information on the projection area and the distance information on the projection area included in the first location information and the distance information on the user, the spatial information on the user, and the motion information on the user included in the second location information.

In addition, the processor 114 may perform the operation corresponding to the voice input of the user based on the information on the relative location.

As an embodiment, the processor 114 may perform a first operation corresponding to the voice input of the user based on identifying that the user is located between the electronic device 100 and the projection area through the information on the relative location. When the voice input of the user is received, the processor 114 may perform pre-processing on the received voice input of the user to acquire voice information, and may perform the operation corresponding to the voice input of the user based on the voice information. The first operation of performing pre-processing on the received voice input of the user may include a pre-processing operation of increasing voice recognition strength, a pre-processing operation of performing noise canceling to acquire voice information of the user, and a pre-processing operation of classifying a voice of the user based on whether or not scene change information of the image projected by the projection part 111 and the voice of the user are discrepant based on the scene change information. The processor 114 may perform at least one of the aforementioned pre-processing operations to perform pre-processing on the received voice.

In addition, a process of performing the preprocessing on the voice input of the user is not limited to the aforementioned operation, and may include various operations for acquiring the voice information of the user.

As an example, the processor 114 may perform an operation of registering the voice information of the user through a setting user interface (UI) of the electronic device 100. That is, the processor 114 may receive the voice of the user through the setting UI of the electronic device 100 and store voice features (e.g., a tone, a gender, a frequency band, an intonation, and a frequently used voice) acquired through the received voice information in the memory 112 to register the voice information of the user. In addition, when a voice corresponding to the registered voice information of the user is received, the processor 114 may perform the operation corresponding to the voice input of the user using the voice information of the user stored in the memory 112 to improve a voice recognition rate.

As an embodiment, the processor 114 may perform a second operation corresponding to the voice input of the user based on identifying that the electronic device 100 is located between the user and the projection area through the information on the relative location.

As an embodiment, when a trigger voice input of the user for activating a voice recognition function is received, the processor 114 may perform a second operation of controlling an external device so that the external device for controlling the electronic device 100 performs the operation corresponding to the voice input of the user. That is, when the electronic device 100 is located between the user and the projection area, a possibility that a sound output from the electronic device 100 and a voice command of the user will collide with each other is low, such that effective voice recognition is possible, and thus, the operation corresponding to the voice input of the user may be performed in the external device to reduce battery consumption of the electronic device 100.

As an embodiment, when the trigger voice input of the user for performing the voice recognition function is received, the processor 114 may perform a second operation of identifying a device that is to perform the operation corresponding to the voice input of the user, of the electronic device 100 and the external device, based on the second location information and location information received from the external device for controlling the electronic device 100. That is, the processor 114 may identify a device close to the user, of the electronic device 100 and the external device as the device that is to perform the operation corresponding to the voice input of the user, based on the second location information and the location information received from the external device for controlling the electronic device 100. In addition, the processor 114 may perform control to turn off a voice recognition function for a device that is not identified as the device that is to perform the operation corresponding to the voice input of the user, of the electronic device 100 and the external device. In this case, effective voice recognition may be performed by allowing the device close to the user, of the electronic device 100 and the external device to perform the operation corresponding to the voice input of the user. However, the disclosure is not limited thereto, and when the user performs voice recognition based on a voice recognition function button of the external device, the operation corresponding to the voice input of the user may be performed in the external device.

It has been described in the aforementioned embodiment that one of the first operation and the second operation corresponding to the operation corresponding to the voice input of the user is performed through the information on the relative location, but the disclosure is not limited thereto. That is, the processor 114 may perform the first operation together with the second operation when it is identified that the electronic device 100 is located between the user and the projection area through the information on the relative location.

As an embodiment, the processor 114 may perform a keystone function of the electronic device when the user deviates from a predetermined viewing angle with respect to the projection area, through the information on the relative location between the projection area, the electronic device, and the user acquired based on the first location information and the second location information. As an example, the predetermined viewing angle may be set in various manners such as a horizontal viewing angle of 90 degrees (each of left and right angles is 45 degrees), a horizontal viewing angle of 60 degrees (each of left and right angles is 30 degrees), a horizontal viewing angle of 120 degrees (each of left and right angles is 60 degrees), and a horizontal viewing angle of 160 degrees (each of left and right angles is 80 degrees), and may be set by the user or be set at the time of manufacturing the electronic device 100. For example, when the user deviates from the predetermined viewing angle with respect to the projection area, the processor 114 may perform a keystone correction to correspond to the location of the user. An embodiment of performing a keystone correction based on the viewing angle will be described later with reference to FIG. 9.

As an embodiment, the processor 114 may acquire information on a distance between the projection area and the user based on the first location information and the second location information. In addition, the processor 114 may perform an operation of adjusting a focus of the image projected on the projection area based on the information on the distance between the projection area and the user.

As an embodiment, the processor 114 may acquire a predetermined viewing angle of the user with respect to the projection area, through the information on the relative location between the projection area, the electronic device, and the user acquired based on the first location information and the second location information.

In addition, when it is identified that the user is located within the predetermined viewing angle and it is identified that the user is located between the projection area and the electronic device 100 through information on the relative location, the processor 114 may identify a value (L1−L2) obtained by subtracting a distance L2 between the user and the electronic device 100 acquired through the second location information from a distance L1 between the projection area and the electronic device 100 acquired through the first location information as a final focal length (L).

In addition, when it is identified that the user is located within the predetermined viewing angle and it is identified that the electronic device 100 is located between the projection area and the user through information on the relative location, the processor 114 may identify a value (L1+L2) obtained by adding a distance L2 between the user and the electronic device 100 acquired through the second location information to a distance L1 between the projection area and the electronic device 100 acquired through the first location information as a final focal length (L).

In addition, when it is identified that the user is located within the predetermined viewing angle and it is identified that the electronic device 100 and the user are located on the same line with respect to the projection area through information on the relative location, the processor 114 may identify a distance L1 between the projection area and the electronic device 100 acquired through the first location information or a distance L2 between the user and the electronic device 100 acquired through the second location information as a final focal length (L=L1=L2).

In addition, the processor 114 may adjust the focus of the image projected on the projection area based on the identified final focal length (L).

A case where a single user is detected through the sensor part 113 has been described in the aforementioned embodiment, but the disclosure is not limited thereto. As an example, when it is identified that the number of users detected through the sensor part 113 is plural, the processor 114 may identify an average value of distances between the electronic device 100 and each of the plurality of users as an average value of the plurality of users based on second location information of each of the plurality of users and perform the aforementioned process. In addition, the aforementioned operation mode of adjusting the focus according to the user distance may be turned on or off according to a selection of the user. However, the disclosure is not limited thereto, and when a plurality of users are detected, at least one of the operation corresponding to the voice input of the user and the operation corresponding to the image quality processing may be performed using only second location information of a user close to the external device for controlling the electronic device 100.

In addition, the processor 114 may perform the operation corresponding to the image quality processing based on the information on the distance between the projection area and the user. As an embodiment, when the distance between the projection area and the user is greater than or equal to a predetermined distance (e.g., 10 m), the processor 114 may perform an image correction for increasing sharpness of the image projected on the projection area. In addition, when the distance between the projection area and the user is less than the predetermined distance (e.g., 10 m), the processor 114 may perform an image correction for decreasing sharpness of the image projected on the projection area.

In addition, the processor 114 may correct the image projected on the projection area by further using information on eyesight of the user together with the information on the distance between the projection area and the user, and a corresponding embodiment will be described later with reference to FIG. 13.

FIG. 2B is a block diagram for describing detailed components of FIG. 2A.

Referring to FIG. 2B, the electronic device 100 may include at least one of the projection part 111, the memory 112, the sensor part 113, the processor 114, a user interface 115, an input/output interface 116, an audio output part 117, or a power part 118. Here, the descriptions of the components provided with reference to FIG. 2A among descriptions related to the projection part 111, the memory 112, the sensor part 113, and the processor 114 are omitted. Meanwhile, components illustrated in FIG. 2B are only an example, and some components may be omitted and new components may be added.

The projection part 111 is a component that projects an image to the outside. The projection part 111 according to an embodiment of the disclosure may be implemented in various projection methods (e.g., a cathode-ray tube (CRT) method, a liquid crystal display (LCD) method, a digital light processing (DLP) method, a laser method, etc.). As an example, the CRT method has basically the same principle as the principle of a CRT monitor. In the CRT method, an image is enlarged with a lens in front of a cathode-ray tube (CRT), and the image is displayed on a screen. According to the number of cathode-ray tubes, the CRT method is divided into a one-tube method and a three-tube method, and in the case of the three-tube method, it may be implemented while cathode-ray tubes of red, green, and blue are divided separately.

As another example, the LCD method is a method of displaying an image by making a light emitted from a light source pass through a liquid crystal. The LCD method is divided into a single-plate method and a three-plate method, and in the case of the three-plate method, a light emitted from a light source may be separated into red, green, and blue at a dichroic mirror (a mirror that reflects only a light in a specific color and makes the remaining lights pass through), and then pass through a liquid crystal, and then the light may be collected into one place again.

As still another example, the DLP method is a method of displaying an image by using a digital micromirror device (DMD) chip. A projection part by the DLP method may include a light source, a color wheel, a DMD chip, a projection lens, etc. A light emitted from a light source may have a color as it passes through a rotating color wheel. The light that passed through the color wheel is input into a DMD chip. The DMD chip includes numerous micromirrors, and reflects the light input into the DMD chip. A projection lens may perform a role of enlarging the light reflected from the DMD chip to an image size.

As still another example, the laser method includes a diode pumped solid state (DPSS) laser and a galvanometer. As a laser outputting various colors, a laser wherein three DPSS lasers were installed for each of RGB colors, and then the optical axes were overlapped by using a special mirror is used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and in general, a projector performs planar scanning, and thus the galvanometer may also be arranged by being divided into x and y axes.

Meanwhile, the projection part 111 may include light sources in various types. For example, the projection part 111 may include at least one light source among a lamp, an LED, and a laser.

Also, the projection part 111 may output images in a 4:3 screen ratio, a 5:4 screen ratio, and a 16:9 wide screen ratio according to the use of the electronic device 100 or a user's setting, etc., and it may output images in various resolutions such as WVGA(854*480), SVGA(800*600), XGA (1024*768), WXGA(1280*720), WXGA(1280*800), SXGA(1280*1024), UXGA(1600*1200), Full HD(1920*1080), etc. according to screen ratios.

Meanwhile, the projection part 111 may perform various functions for adjusting an output image by control of the processor 114. For example, the projection part 111 may perform functions such as zoom, keystone, quick corner (4 corner) keystone, lens shift, etc.

Specifically, the projection part 111 may enlarge or reduce an image according to a distance (a projection distance) to the screen. That is, a zoom function may be performed according to a distance to the screen. Here, the zoom function may include a hardware method of adjusting the size of the screen by moving a lens and a software method of adjusting the size of the screen by cropping an image, etc. Meanwhile, when the zoom function is performed, adjustment of a focus of an image is needed. For example, methods of adjusting a focus include a manual focus method, an electric method, etc. The manual focus method means a method of manually adjusting a focus, and the electric method means a method wherein the projector automatically adjusts a focus by using a built-in motor when the zoom function is performed. When performing the zoom function, the projection part 111 may provide a digital zoom function through software, and it may also provide an optical zoom function of performing the zoom function by moving a lens through the driving part.

Also, the projection part 111 may perform a keystone function. When the height does not fit in the case of front surface scanning, the screen may be distorted in an upper direction or a lower direction. The keystone function means a function of correcting a distorted screen. For example, if distortion occurs in left and right directions of the screen, the screen may be corrected by using a horizontal keystone, and if distortion occurs in upper and lower directions, the screen may be corrected by using a vertical keystone. The quick corner (4 corner) keystone function is a function of correcting the screen in case the central area of the screen is normal, but the balance of the corner areas is not appropriate. The lens shift function is a function of moving the screen as it is in case the screen is outside the screen area.

Meanwhile, the projection part 111 may automatically analyze the surrounding environment and the projection environment without a user input, and perform zoom/keystone/focus functions. Specifically, the projection part 111 may automatically provide zoom/keystone/focus functions based on the distance between the electronic device 100 and the screen, information on the space wherein the electronic device 100 is currently located, information on the light amount in the surroundings, etc. that were sensed through sensors (a depth camera, a distance sensor, an infrared sensor, an illumination sensor, etc.).

Also, the projection part 111 may provide an illumination function by using a light source. In particular, the projection part 111 may provide an illumination function by outputting a light source by using an LED. According to an embodiment of the disclosure, the projection part 111 may include an LED, and according to another embodiment of the disclosure, the electronic device may include a plurality of LEDs. Meanwhile, the projection part 111 may output a light source by using a surface-emitting LED depending on implementation examples. Here, the surface-emitting LED may mean an LED that has a structure wherein an optical sheet is arranged on the upper side of the LED such that a light source is output while being evenly dispersed. Specifically, when a light source is output through the LED, the light source may be evenly dispersed through the optical sheet, and the light source dispersed through the optical sheet may be introduced into a display panel.

Meanwhile, the projection part 111 may provide a dimming function for adjusting the strength of a light source to a user. Specifically, if a user input for adjusting the strength of a light source is received from a user through a user interface 116 (e.g., a touch display button or a dial), the projection part 111 may control the LED to output the strength of a light source corresponding to the received user input.

Also, the projection part 111 may provide the dimming function based on a content analyzed by the processor 114 without a user input. Specifically, the projection part 111 may control the LED to output the strength of a light source based on information on a content that is currently provided (e.g., the type of the content, the brightness of the content, etc.).

Meanwhile, the projection part 111 may control a color temperature by control of the processor 114. Here, the processor 114 may control a color temperature based on a content. Specifically, if it is identified that a content is going to be output, the processor 114 may acquire color information for each frame of the content which was determined to be output. Then, the processor 114 may control the color temperature based on the acquired color information for each frame. Here, the processor 114 may acquire at least one main color of the frames based on the color information for each frame. Then, the processor 114 may adjust the color temperature based on the acquired at least one main color. For example, a color temperature that the processor 114 can adjust may be divided into a warm type or a cold type. Here, it is assumed that a frame to be output (referred to as an output frame hereinafter) includes a scene wherein fire occurred. The processor 114 may identify (or acquire) that the main color is red based on color information currently included in the output frame. Then, the processor 114 may identify a color temperature corresponding to the identified main color (red). Here, the color temperature corresponding to red may be a warm type. Meanwhile, the processor 114 may use an artificial intelligence model for acquiring color information or a main color of a frame. According to an embodiment of the disclosure, the artificial intelligence model may be stored in the electronic device 100 (e.g., the memory 112). According to another embodiment of the disclosure, the artificial intelligence model may be stored in an external server that can communicate with the electronic device 100.

Meanwhile, the electronic device 100 may be interlocked with an external device and control the illumination function. Specifically, the electronic device 100 may receive illumination information from an external device. Here, the illumination information may include at least one of brightness information and color temperature information set in the external device. Here, the external device may mean a device connected to the same network as the electronic device 100 (e.g., an IoT device included in the same home/company network) or a device which is not connected to the same network as the electronic device 100, but which can communicate with the electronic device (e.g., a remote control server). For example, it is assumed that an external illumination device included in the same network as the electronic device 100 (an IoT device) is outputting a red illumination at the brightness of 50. The external illumination device (an IoT device) may directly or indirectly transmit illumination information (e.g., information indicating that a red illumination is being output at the brightness of 50) to the electronic device. Here, the electronic device 100 may control the output of a light source based on the illumination information received from the external illumination device. For example, if the illumination information received from the external illumination device includes information that a red illumination is being output at the brightness of 50, the electronic device 100 may output the red illumination at the brightness of 50.

Meanwhile, the electronic device 100 may control the illumination function based on bio-information. Specifically, the processor 114 may acquire bio-information of a user. Here, the bio-information may include at least one of the body temperature, the heart rate, the blood pressure, the breath, or the electrocardiogram of the user. Here, the bio-information may include various information other than the aforementioned information. As an example, the electronic device may include a sensor for measuring bio-information. The processor 114 may acquire bio-information of a user through the sensor, and control the output of a light source based on the acquired bio-information. As another example, the processor 114 may receive bio-information from an external device through the input/output interface 116. Here, the external device may mean a portable communication device of a user (e.g., a smartphone or a wearable device). The processor 114 may acquire bio-information of a user from the external device, and control the output of a light source based on the acquired bio-information. Meanwhile, depending on implementation examples, the electronic device may identify whether a user is sleeping, and if it is identified that a user is sleeping (or preparing to sleep), the processor 114 may control the output of a light source based on the bio-information of the user.

The memory 112 may store at least one instruction regarding the electronic device 100. Also, in the memory 112, an operating system (O/S) for driving the electronic device 100 may be stored. In addition, in the memory 112, various software programs or applications for the electronic device 100 to operate according to the various embodiments of the disclosure may be stored. Further, the memory 112 may include a semiconductor memory such as a flash memory or a magnetic storage medium such as a hard disk.

Specifically, in the memory 112, various kinds of software modules for the electronic device 100 to operate according to the various embodiments of the disclosure may be stored, and the processor 114 may control the operations of the electronic device 100 by executing the various kinds of software modules stored in the memory 112. That is, the memory 112 may be accessed by the processor 114, and reading/recording/correcting/deleting/updating, etc. of data by the processor 114 may be performed.

Meanwhile, in the disclosure, the term memory 112 may be used as meaning including the memory 112, a ROM (not shown) and a RAM (not shown) inside the processor 114, or a memory card (not shown) installed on the electronic device 100 (e.g., a micro SD card, a memory stick).

The user interface 115 may include input devices in various types. For example, the user interface 115 may include a physical button. Here, the physical button may include a function key, direction keys (e.g., four direction keys), or a dial button. According to an embodiment of the disclosure, the physical button may be implemented as a plurality of keys. According to another embodiment of the disclosure, the physical button may be implemented as one key. Here, in case the physical button is implemented as one key, the electronic device 100 may receive a user input by which one key is pushed for equal to or longer than a threshold time. If a user input by which one key is pushed for equal to or longer than a threshold time is received, the processor 114 may perform a function corresponding to the user input. For example, the processor 114 may provide the illumination function based on the user input.

Also, the user interface 115 may receive a user input by using a non-contact method. In the case of receiving a user input through a contact method, physical force should be transmitted to the electronic device. Accordingly, a method for controlling the electronic device regardless of physical force may be needed. Specifically, the user interface 115 may receive a user gesture, and perform an operation corresponding to the received user gesture. Here, the user interface 115 may receive a gesture of a user through a sensor (e.g., an image sensor or an infrared sensor).

In addition, the user interface 115 may receive a user input by using a touch method. For example, the user interface 115 may receive a user input through a touch sensor. According to an embodiment of the disclosure, a touch method may be implemented as a non-contact method. For example, the touch sensor may determine whether a user's body approached within a threshold distance. Here, the touch sensor may identify a user input even when a user does not contact the touch sensor. Meanwhile, according to a different implementation example, the touch sensor may identify a user input by which a user contacts the touch sensor.

Meanwhile, the electronic device 100 may receive user inputs by various methods other than the aforementioned user interface. As an example, the electronic device 100 may receive a user input through an external remote control device. Here, the external remote control device may be a remote control device corresponding to the electronic device 100 (e.g., a control device dedicated to the electronic device) or a portable communication device of a user (e.g., a smartphone or a wearable device). Here, in the portable communication device of a user, an application for controlling the electronic device may be stored. The portable communication device may acquire a user input through the stored application, and transmit the acquired user input to the electronic device 100. The electronic device 100 may receive the user input from the portable communication device, and perform an operation corresponding to the user's control command.

Meanwhile, the electronic device 100 may receive a user input by using voice recognition. According to an embodiment of the disclosure, the electronic device 100 may receive a user voice through the microphone included in the electronic device. According to another embodiment of the disclosure, the electronic device 100 may receive a user voice from the microphone or an external device. Specifically, an external device may acquire a user voice through a microphone of the external device, and transmit the acquired user voice to the electronic device 100. The user voice transmitted from the external device may be audio data or digital data converted from audio data (e.g., audio data converted to a frequency domain, etc.). Here, the electronic device 100 may perform an operation corresponding to the received user voice. Specifically, the electronic device 100 may receive audio data corresponding to the user voice through the microphone. Then, the electronic device 100 may convert the received audio data into digital data. Then, the electronic device 100 may convert the converted digital data into text data by using a speech to text (STT) function. According to an embodiment of the disclosure, the speech to text (STT) function may be directly performed at the electronic device 100.

According to another embodiment of the disclosure, the speech to text (STT) function may be performed at an external server. The electronic device 100 may transmit digital data to the external server. The external server may convert the digital data into text data, and acquire control command data based on the converted text data. The external server may transmit the control command data (here, the text data may also be included) to the electronic device 100. The electronic device 100 may perform an operation corresponding to the user voice based on the acquired control command data.

Meanwhile, the electronic device 100 may provide a voice recognition function by using one assistance (or an artificial intelligence agent, e.g., Bixby™, etc.), but this is merely an example, and the electronic device 100 may provide a voice recognition function through a plurality of assistances. Here, the electronic device 100 may provide the voice recognition function by selecting one of the plurality of assistances based on a trigger word corresponding to the assistance or a specific key that exists on the remote control.

Meanwhile, the electronic device 100 may receive a user input by using a screen interaction. The screen interaction may mean a function of the electronic device of identifying whether a predetermined event occurs through an image projected on a screen (or a projection surface), and acquiring a user input based on the predetermined event. Here, the predetermined event may mean an event wherein a predetermined object is identified in a specific location (e.g., a location wherein a UI for receiving a user input was projected). Here, the predetermined object may include at least one of a body part of a user (e.g., a finger), a pointer, or a laser point. If the predetermined object is identified in a location corresponding to the projected UI, the electronic device 100 may identify that a user input selecting the projected UI was received. For example, the electronic device 100 may project a guide image so that the UI is displayed on the screen. Then, the electronic device 100 may identify whether the user selects the projected UI. Specifically, if the predetermined event is identified in the location of the projected UI, the electronic device 100 may identify that the user selected the projected UI. Here, the projected UI may include at least one item. Here, the electronic device 100 may perform spatial analysis for identifying whether the predetermined event is in the location of the projected UI. Here, the electronic device 100 may perform spatial analysis through a sensor (e.g., an image sensor, an infrared sensor, a depth camera, a distance sensor, etc.). By performing spatial analysis, the electronic device 100 may identify whether the predetermined event occurs in the specific location (the location wherein the UI was projected). Then, if it is identified that the predetermined event occurs in the specific location (the location wherein the UI was projected), the electronic device 100 may identify that a user input for selecting the UI corresponding to the specific location was received.

The input/output interface 116 is a component for inputting or outputting at least one of an audio signal and an image signal. The input/output interface 116 may receive input of at least one of an audio signal and an image signal from an external device, and output a control command to the external device.

Meanwhile, the input/output interface 116 according to an embodiment of the disclosure may be implemented as a wired input/output interface of at least one of a high definition multimedia interface (HDMI), a mobile high-definition link (MHL), a universal serial bus (USB), a USB C-type, a display port (DP), a Thunderbolt, a video graphics array (VGA) port, an RGB port, a Dsubminiature (D-SUB), or a digital visual interface (DVI). According to an embodiment of the disclosure, the wired input/output interface may be implemented as an interface inputting or outputting only audio signals and an interface inputting or outputting only image signals, or implemented as one interface inputting or outputting both audio signals and image signals.

Also, the electronic device 100 may receive data through the wired input/output interface, but this is merely an example, and the electronic device 100 may be supplied with power through the wired input/output interface. For example, the electronic device 100 may be supplied with power from an external battery through a USB C-type, or supplied with power from a consent through a power adapter. As another example, the electronic device may be supplied with power from an external device (e.g., a laptop computer or a monitor, etc.) through a DP.

Meanwhile, the input/output interface 116 according to an embodiment of the disclosure may be implemented as a wireless input/output interface that performs communication by at least one communication method among the communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both audio signals and image signals.

Also, the electronic device 100 may be implemented such that an audio signal is input through a wired input/output interface, and an image signal is input through a wireless input/output interface. Alternatively, the electronic device 100 may be implemented such that an audio signal is input through a wireless input/output interface, and an image signal is input through a wired input/output interface.

The audio output part 117 is a component that outputs audio signals. In particular, the audio output part 117 may include an audio output mixer, an audio signal processor, and an audio output module. The audio output mixer may mix a plurality of audio signals to be output as at least one audio signal. For example, the audio output mixer may mix an analog audio signal and another analog audio signal (e.g.: an analog audio signal received from the outside) as at least one analog audio signal. The audio output module may include a speaker or an output terminal. According to an embodiment of the disclosure, the audio output module may include a plurality of speakers, and in this case, the audio output module may be arranged inside the main body, and audio that is emitted while covering at least a part of a vibration plate of the audio output module may be transmitted to the outside of the main body after passing through a waveguide. The audio output module may include a plurality of audio output units, and the plurality of audio output units may be symmetrically arranged on the exterior of the main body, and accordingly, audio may be emitted to all directions, i.e., all directions in 360 degrees.

The power part 118 may be supplied with power from the outside and supply the power to various components of the electronic device 100. The power part 118 according to an embodiment of the disclosure may be supplied with power through various methods. As an example, the power part 118 may be supplied with power by using the connector 130 as illustrated in FIG. 1. Also, the power part 118 may be supplied with power by using a DC power code of 112V. However, the disclosure is not limited thereto, and the electronic device may be supplied with power by using a USB power code or supplied with power by using a wireless charging method.

Also, the power part 118 may be supplied with power by using an internal battery or an external battery. The power part 118 according to an embodiment of the disclosure may be supplied with power through an internal battery. As an example, the power part 118 may charge power of the internal battery by using at least one of a DC power code of 112V, a USB power code, or a USB C-type power code, and may be supplied with power through the charged internal battery. Also, the power part 118 according to an embodiment of the disclosure may be supplied with power through an external battery. As an example, if connection between the electronic device and an external battery is performed through various wired communication methods such as a USB power code, a USB C-type power code, a socket groove, etc., the power part 118 may be supplied with power through the external battery. That is, the power part 118 may be directly supplied with power from an external battery, or charge an internal battery through an external battery, and supplied with power from the charged internal battery.

The power part 118 according to the disclosure may be supplied with power by using at least one of the aforementioned plurality of power supplying methods.

Meanwhile, regarding power consumption, the electronic device 100 may have power consumption of equal to or smaller than a predetermined value (e.g., 43 W) for the reason of a form of a socket or other standards, etc. Here, the electronic device 100 may vary the power consumption such that the power consumption can be reduced when using a battery. That is, the electronic device 100 may vary the power consumption based on the power supplying method and the use amount of power, etc.

Meanwhile, the electronic device 100 according to an embodiment of the disclosure may provide various smart functions.

Specifically, the electronic device 100 may be connected with a portable terminal device for controlling the electronic device 100, and the screen output at the electronic device 100 may be controlled through a user input that is input at the portable terminal device. As an example, the portable terminal device may be implemented as a smartphone including a touch display, and the electronic device 100 may receive screen data provided at the portable terminal device from the portable terminal device and output the data, and the screen output at the electronic device 100 may be controlled according to a user input that is input at the portable terminal device.

The electronic device 100 may perform connection with the portable terminal device through various communication methods such as Miracast, Airplay, wireless DEX, a remote PC method, etc., and share contents or music provided at the portable terminal device.

Also, connection between the portable terminal device and the electronic device 100 may be performed by various connection methods. As an example, the electronic device 100 may be searched at the portable terminal device and wireless connection may be performed, or the portable terminal device may be searched at the electronic device 100 and wireless connection may be performed. Then, the electronic device 100 may output contents provided at the portable terminal device.

As an example, in a state wherein a specific content or music is being output at the portable terminal device, if the portable terminal device is located around the electronic device, and then a predetermined gesture (e.g., a motion tap view) is detected through a display of the portable terminal device, the electronic device 100 may output the content or music that is being output at the portable terminal device.

As an example, in a state wherein a specific content or music is being output at the portable terminal device, if the portable terminal device becomes close to the electronic device 100 by equal to or smaller than a predetermined distance (e.g., a non-contact tap view), or the portable terminal device contacts the electronic device 100 two times at a short interval (e.g., a contact tap view), the electronic device 100 may output the content or music that is being output at the portable terminal device.

In the aforementioned embodiment, it was described that the same screen as the screen that is being provided at the portable terminal device is provided at the electronic device 100, but the disclosure is not limited thereto. That is, if connection between the portable terminal device and the electronic device 100 is constructed, a first screen provided at the portable terminal device may be output at the portable terminal device, and a second screen provided at the portable terminal device that is different from the first screen may be output at the electronic device 100. As an example, the first screen may be a screen provided by a first application installed on the portable terminal device, and the second screen may be a screen provided by a second application installed on the portable terminal device. As an example, the first screen and the second screen may be different screens from each other that are provided by one application installed on the portable terminal device. Also, as an example, the first screen may be a screen including a UI in a remote control form for controlling the second screen.

The electronic device 100 according to the disclosure may output a standby screen. As an example, in case connection between the electronic device 100 and an external device was not performed or in case there is no input received from an external device during a predetermined time, the electronic device 100 may output a standby screen. Conditions for the electronic device 100 to output a standby screen are not limited to the aforementioned example, and a standby screen may be output by various conditions.

The electronic device 100 may output a standby screen in the form of a blue screen, but the disclosure is not limited thereto. As an example, the electronic device 100 may extract only a shape of a specific object from data received from an external device and acquire an atypical object, and output a standby screen including the acquired atypical object.

Figure 3:
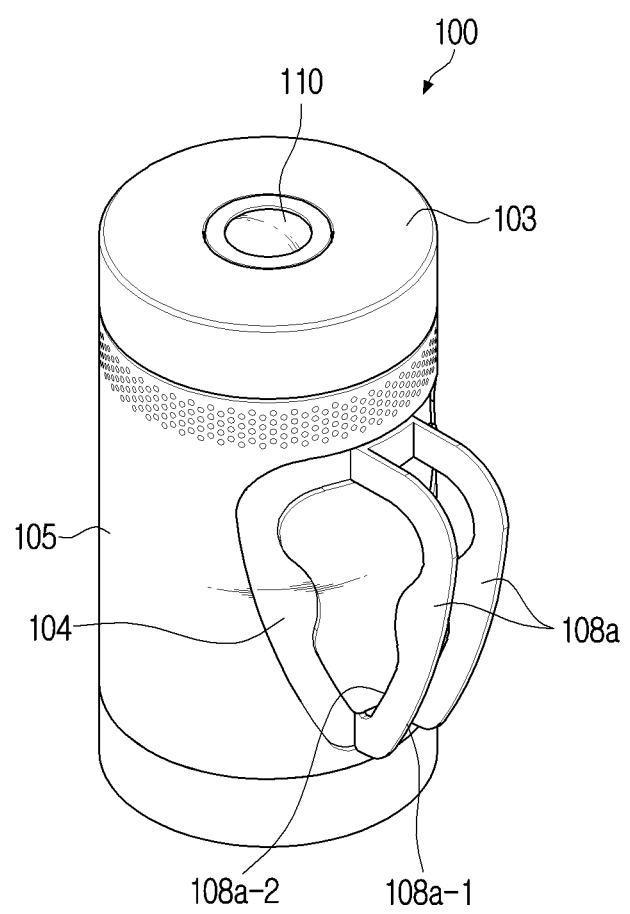
FIG. 3 is a perspective view illustrating an exterior of an electronic device according to other embodiments of the disclosure.

FIG. 3 is a perspective view illustrating the exterior of the electronic device 100 according to other embodiments of the disclosure.

Referring to FIG. 3, the electronic device 100 may include a support (or, it may be referred to as "a handle") 108a.

The support 108a according to the various embodiments of the disclosure may be a handle or a ring that is provided for a user to grip or move the electronic device 100. Alternatively, the support 108a may be a stand that supports the main body 105 while the main body 105 is laid down in the direction of the side surface.

The support 108a may be connected in a hinge structure such that it is coupled to or separated from the outer circumferential surface of the main body 105 as illustrated in FIG. 3, and it may be selectively separated from or fixed to the outer circumferential surface of the main body 105 according to a user's need. The number, shape, or arrangement structure of the support 108a may be implemented in various ways without restriction. Although not illustrated in the drawings, the support 108a may be housed inside the main body 105, and it may be taken out and used by a user depending on needs. Alternatively, the support 108a may be implemented as a separate accessory, and it may be attached to or detached from the electronic device 100.

The support 108a may include a first support surface 108a-1 and a second support surface 108a-2. The first support surface 108a-1 may be a surface that faces the outer direction of the main body 105 while the support 108a is separated from the outer circumferential surface of the main body 105, and the second support surface 108a-2 may be a surface that faces the inner direction of the main body 105 while the support 108a is separated from the outer circumferential surface of the main body 105.

The first support surface 108a-1 may proceed toward the upper part of the main body 105 from the lower part of the main body 105 and get far from the main body 105, and the first support surface 108a-1 may have a shape that is flat or uniformly curved. In case the electronic device 100 is held such that the outer side surface of the main body 105 contacts the bottom surface, i.e., in case the electronic device 100 is arranged such that the projection lens 110 is toward the front surface direction, the first support surface 108a-1 may support the main body 105. In an embodiment including two or more supports 108a, the emission angle of the head 103 and the projection lens 110 may be adjusted by adjusting the interval or the hinge opening angle of the two supports 108a.

The second support surface 108a-2 is a surface that contacts a user or an external holding structure when the support 108a is supported by the user or the external holding structure, and it may have a shape corresponding to the gripping structure of the user's hand or the external holding structure such that the electronic device 100 does not slip in case the electronic device 100 is supported or moved. The user may make the projection lens 110 face toward the front surface direction, and fix the head 103 and hold the support 108a, and move the electronic device 100, and use the electronic device 100 like a flashlight.

The support groove 104 is a groove structure that is provided on the main body 105 and wherein the support 108a can be accommodated when it is not used, and as illustrated in FIG. 3, the support groove 104 may be implemented as a groove structure corresponding to the shape of the support 108a on the outer circumferential surface of the main body 105. Through the support groove 104, the support 108a may be kept on the outer circumferential surface of the main body 105 when the support 108a is not used, and the outer circumferential surface of the main body 105 may be maintained to be slick.

Alternatively, in a situation wherein the support 108a is kept inside the main body 105 and the support 108a is needed, the electronic device 100 may have a structure wherein the support 108a is taken out to the outside of the main body 105. In this case, the support groove 104 may be a structure that is led into the inside of the main body 105 so as to accommodate the support 108a, and the second support surface 108a-2 may include a door (not shown) that adheres to the outer circumferential surface of the main body 105 or opens or closes the separate support groove 104.

Although not illustrated in the drawings, the electronic device 100 may include various kinds of accessories that are helpful in using or keeping the electronic device 100. For example, the electronic device 100 may include a protection case (not shown) such that the electronic device 100 can be easily carried while being protected. Alternatively, the electronic device 100 may include a tripod (not shown) that supports or fixes the main body 105, and a bracket (not shown) that can be coupled to an outer surface and fix the electronic device 100.

Figure 4:
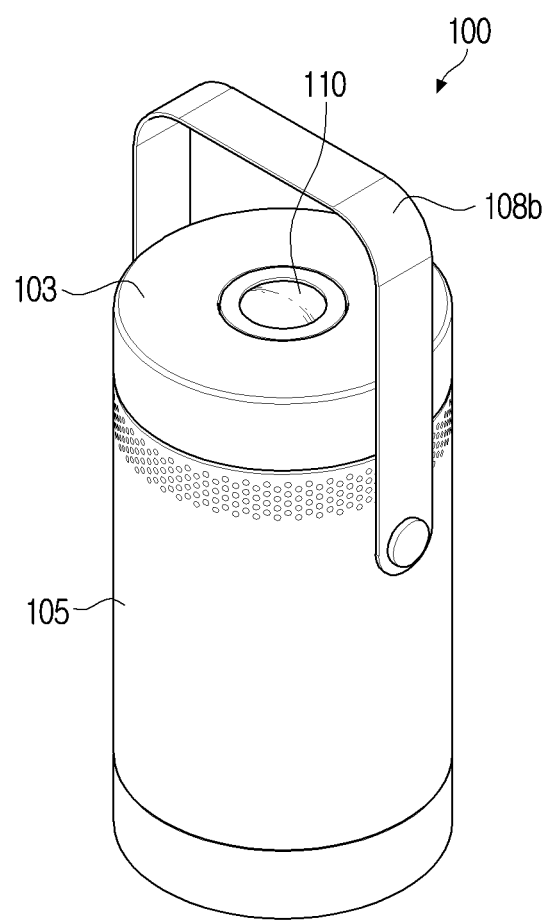
FIG. 4 is a perspective view illustrating an exterior of an electronic device according to still other embodiments of the disclosure.

FIG. 4 is a perspective view illustrating the exterior of the electronic device 100 according to still other embodiments of the disclosure.

Referring to FIG. 4, the electronic device 100 may include a support (or, it may be referred to as "a handle") 108b.

The support 108b according to the various embodiments of the disclosure may be a handle or a ring that is provided for a user to grip or move the electronic device 100. Alternatively, the support 108b may be a stand that supports the main body 105 so that the main body 105 can be toward a random angle while the main body 105 is laid down in the direction of the side surface.

Specifically, as illustrated in FIG. 4, the support 108b may be connected with the main body 105 at a predetermined point (e.g., a ⅔-¾ point of the height of the main body) of the main body 105. When the support 108b is rotated in the direction of the main body, the main body 105 may be supported such that the main body 105 can be toward a random angle while the main body 105 is laid down in the direction of the side surface.

Figure 5:
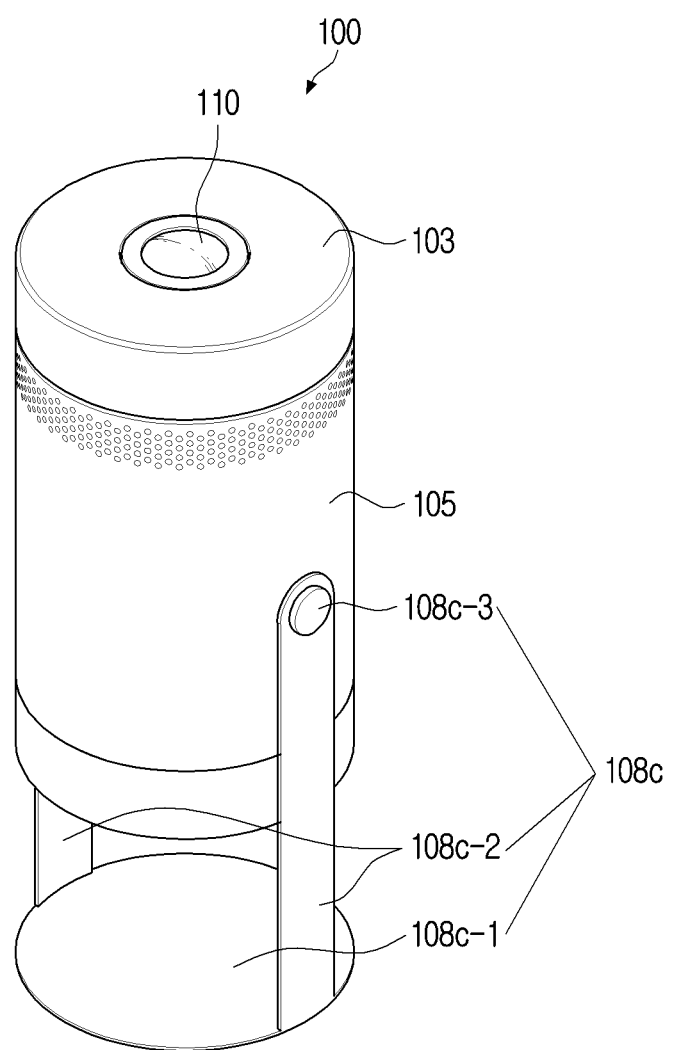
FIG. 5 is a perspective view illustrating an exterior of an electronic device according to still other embodiments of the disclosure.

FIG. 5 is a perspective view illustrating the exterior of the electronic device 100 according to still other embodiments of the disclosure.

Referring to FIG. 5, the electronic device 100 may include a support (or, it may be referred to as "a prop") 108c. The support 108c according to the various embodiments of the disclosure may include a base plate 108c-1 that is provided to support the electronic device 100 on the ground and two support members 108c-2 connecting the base plate 108c-1 and the main body 105.

According to an embodiment of the disclosure, the heights of the two support members 108c-2 are identical, and thus each one cross section of the two support members 108c-2 may be coupled or separated by a groove and a hinge member 108c-3 provided on one outer circumferential surface of the main body 105.

The two support members may be hinge-coupled to the main body 105 at a predetermined point (e.g., a ⅓-⅔ point of the height of the main body) of the main body 105.

When the two support members and the main body are coupled by the hinge member 108c-3, the main body 105 is rotated based on a virtual horizontal axis formed by the two hinge members 108c-3, and accordingly, the emission angle of the projection lens 110 may be adjusted.

Figure 6A:
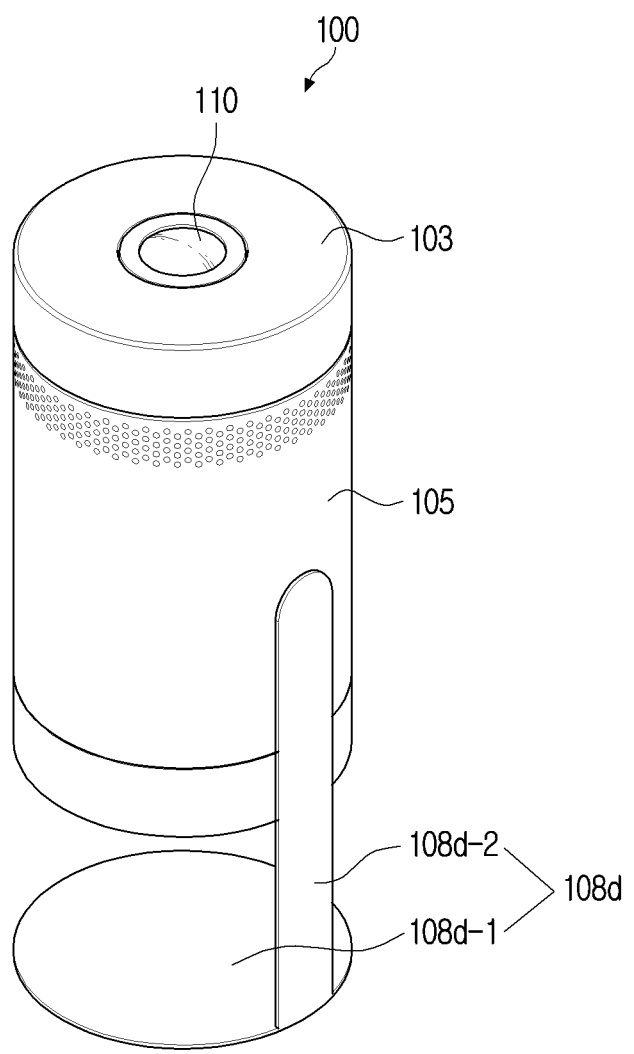
FIG. 6A is a perspective view illustrating an exterior of an electronic device according to still other embodiments of the disclosure.
Figure 6B:
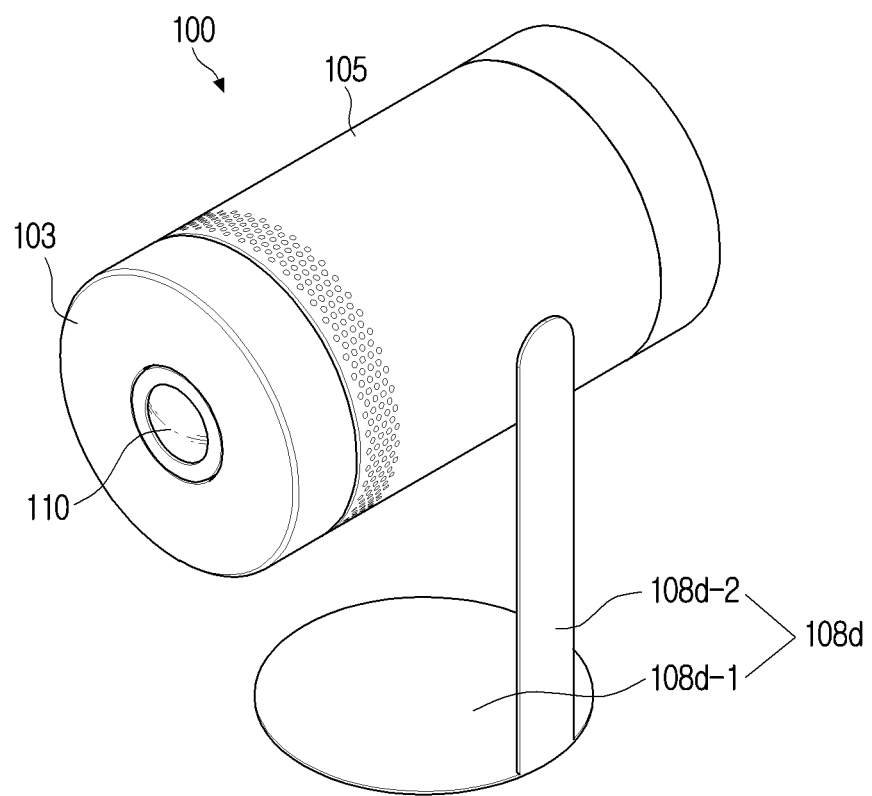
FIG. 6B is a perspective view illustrating a state in which the electronic device in FIG. 6A is rotated.

FIG. 5 illustrates an embodiment wherein the two support members 108c-2 are connected with the main body 105, but the disclosure is not limited thereto, and as in FIG. 6A and FIG. 6B, one support member and the main body 105 may be connected by one hinge member.

FIG. 6A is a perspective view illustrating the exterior of the electronic device 100 according to still other embodiments of the disclosure.

FIG. 6B is a perspective view illustrating a state wherein the electronic device 100 in FIG. 6A is rotated.

Referring to FIG. 6A and FIG. 6B, the support 108d according to the various embodiments of the disclosure may include a base plate 108d-1 that is provided to support the electronic device 100 on the ground and one support member 108d-2 connecting the base plate 108d-1 and the main body 105.

Also, the cross section of the one support member 108d-2 may be coupled or separated by a groove and a hinge member (not shown) provided on one outer circumferential surface of the main body 105.

When the one support member 108d-2 and the main body 105 are coupled by one hinge member (not shown), the main body 105 may be rotated based on a virtual horizontal axis formed by the one hinger member (not shown), as in FIG. 6B.

Meanwhile, the supports illustrated in FIGS. 3, 4, 5, 6A, and 6B are merely examples, and the electronic device 100 can obviously include supports in various locations or forms.

Figure 7:
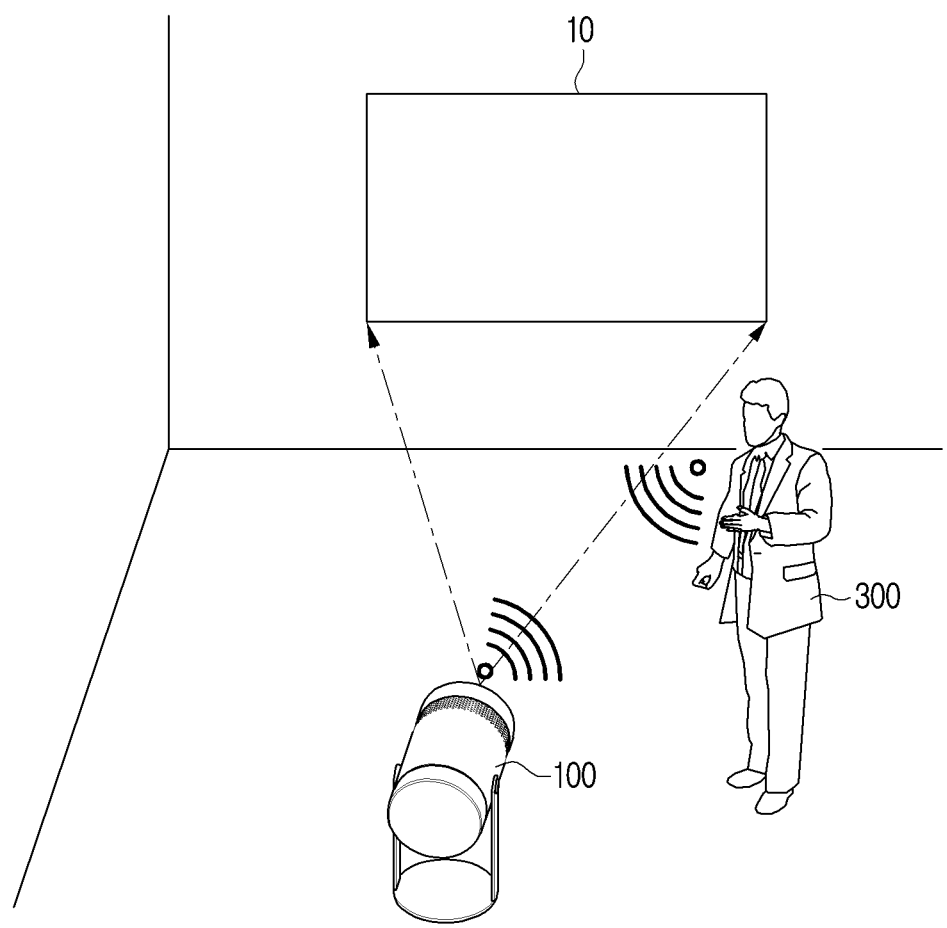
FIG. 7 is a view illustrating an embodiment of performing an operation corresponding to a voice input of a user based on a location of the user according to the disclosure.

FIG. 7 is a view illustrating an embodiment of performing an operation corresponding to a voice input of a user based on a location of the user according to the disclosure.

As illustrated in FIG. 7, when a user 300 is located between an electronic device 100 and a projection area 10 of an image projected by the electronic device 100, the electronic device 100 may perform a first operation corresponding to a voice input of the user.

The electronic device 100 may acquire first location information on the projection area 10 and second location information on the user 300 using a sensor (e.g., a ToF sensor). In addition, the electronic device 100 may identify that the user 300 is located between the electronic device 100 and the projection area 10 of the image projected by the electronic device 100 based on the first location information and the second location information. For example, when the electronic device 100 acquires the first location information and the second location information through the ToF sensor, the electronic device 100 may acquire information on a relative location between the projection area 10, the user 300, and the electronic device 100 based on spatial information and distance information on the projection area 10 and spatial information, distance information, and motion information on the user. In addition, the electronic device 100 may identify that the user 300 is located between the electronic device 100 and the projection area 10 of the image projected by the electronic device 100 based on the information on the relative location.

In addition, when a voice input of the user for performing a voice recognition function of the user 300 is received, the electronic device 100 may perform a first operation corresponding to the voice input of the user. The first operation is an operation for improving a voice recognition rate by performing pre-processing on the received voice of the user, and a process of performing the pre-processing on the received voice may include a pre-processing operation of increasing voice recognition strength, a pre-processing operation of performing noise canceling to acquire voice information of the user, and a pre-processing operation of classifying the voice of the user based on whether or not scene change information of the image projected by the projection part 111 and the voice of the user are discrepant based on the scene change information.

As illustrated in FIG. 7, when the user 300 is located between the electronic device 100 and the projection area 10, a voice recognition rate of the user 300 may be reduced due to a sound output from the electronic device 100. Accordingly, the disclosure may improve the voice recognition rate by performing the first operation corresponding to the voice input of the user as described above.

Figure 8:
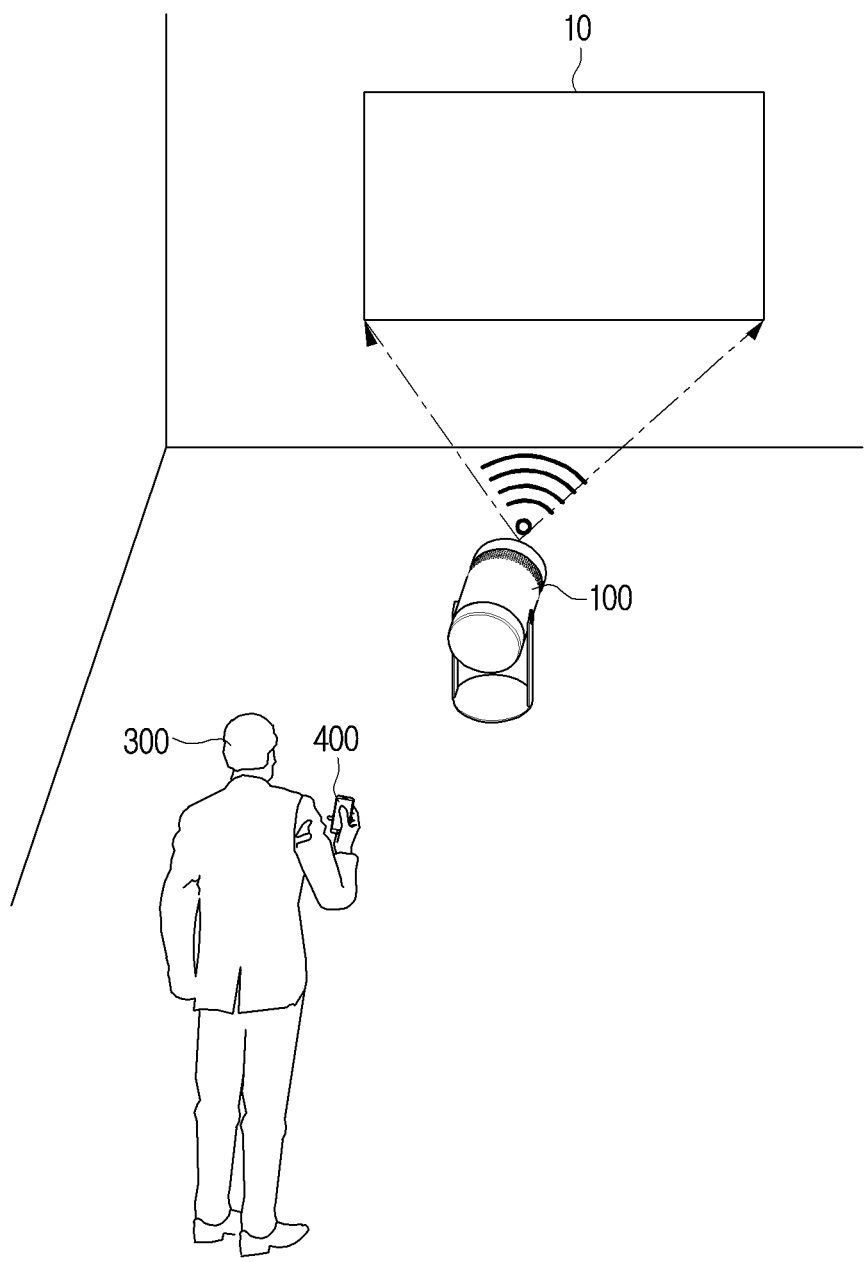
FIG. 8 is a view illustrating an embodiment of performing an operation corresponding to the voice input of the user based on the location of the user according to the disclosure.

FIG. 8 is a view illustrating an embodiment of performing an operation corresponding to the voice input of the user based on the location of the user according to the disclosure.

As illustrated in FIG. 8, when the electronic device 100 is located between the user 300 and the projection area 10 of the image projected by the electronic device 100, the electronic device 100 may perform a second operation corresponding to the voice input of the user.

The electronic device 100 may acquire first location information on the projection area 10 and second location information on the user 300 using a sensor (e.g., a ToF sensor). In addition, the electronic device 100 may identify that the electronic device 100 is located between the user 300 and the projection area 10 of the image projected by the electronic device 100 based on the first location information and the second location information. For example, when the electronic device 100 acquires the first location information and the second location information through the ToF sensor, the electronic device 100 may acquire information on a relative location between the projection area 10, the user 300, and the electronic device 100 based on spatial information and distance information on the projection area 10 and spatial information, distance information, and motion information on the user. In addition, the electronic device 100 may identify that the electronic device 100 is located between the user 300 and the projection area 10 of the image projected by the electronic device 100 based on the information on the relative location.

As a first embodiment, when it is identified that the electronic device 100 is located between the user 300 and the projection area 10 and a trigger voice input of the user for performing a voice recognition function is received, the electronic device 100 may control an external device 400 so that the external device 400 for controlling the electronic device 100 performs an operation corresponding to the voice input of the user. That is, when the electronic device 100 is located between the user 300 and the projection area 10, a possibility that a sound output from the electronic device 100 and a voice command of the user 300 will collide with each other is low, such that effective voice recognition is possible, and thus, the electronic device 100 may control the external device 400 to perform the operation corresponding to the voice input of the user to reduce battery consumption of the electronic device 100. Here, the external device 400 may be a remote control for controlling the electronic device 100, but is not limited thereto, and may include various electronic devices capable of communicating with the electronic device 100, such as a user terminal device.

As a second embodiment, when it is identified that the electronic device 100 is located between the user 300 and the projection area 10 and a trigger voice input of the user for performing a voice recognition function is received, the electronic device 100 may identify a device that is to perform an operation corresponding to the voice input of the user, of the electronic device 100 and the external device 400, based on the second location information on the user 300 and location information received from the external device 400 for controlling the electronic device 100. That is, the electronic device 100 may identify a device close to the user, of the electronic device 100 and the external device 400 as the device that is to perform the operation corresponding to the voice input of the user, based on the second location information and the location information received from the external device 400. In addition, the electronic device 100 may perform control to turn off a voice recognition function for a device that is not identified as the device that is to perform the operation corresponding to the voice input of the user, of the electronic device 100 and the external device 400. However, the disclosure is not limited thereto, and when the user 300 performs voice recognition based on a voice recognition function button of the external device 400, voice recognition may be performed by the external device 400 without performing a process of identifying the device that is to perform the operation corresponding to the voice input of the user.

In a case of FIG. 8, because the user 300 is close to the external device 400, the electronic device 100 may control the external device 400 so that the external device 400 performs the operation corresponding to the voice input of the user, and may turn off the voice recognition function in the electronic device 100. Through a second embodiment, effective voice recognition may be performed by allowing the device close to the user 300, of the electronic device 100 and the external device 400 to perform the operation corresponding to the voice input of the user.

Figure 9:
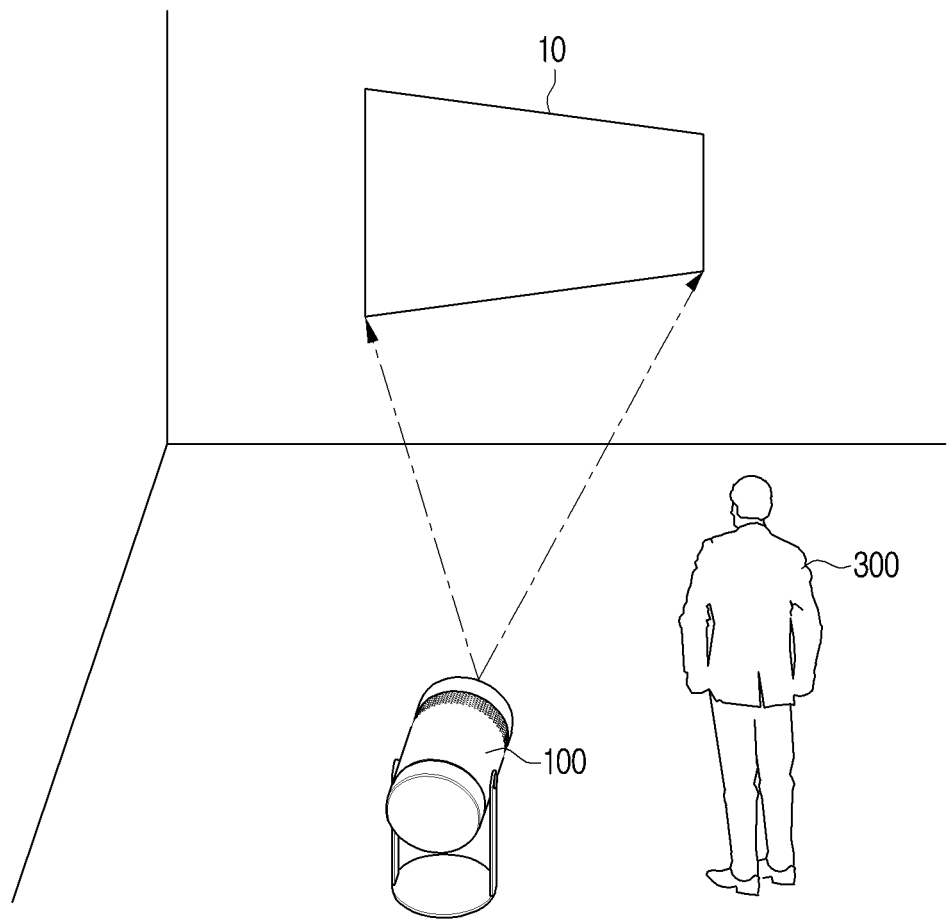
FIG. 9 is a view illustrating an embodiment of performing a keystone function based on the location of the user.

FIG. 9 is a view illustrating an embodiment of performing a keystone function based on the location of the user.

As illustrated in FIG. 9, when the user 300 deviates from a predetermined viewing angle with respect to the projection area 10, the electronic device 100 may perform a keystone function based on the location of the user 300.

The electronic device 100 may acquire information on a relative location between the projection area 10, the electronic device 100, and the user 300 based on first location information on the projection area 10 and second location information on the user 300. In addition, the electronic device 100 may identify whether or not the user 300 deviates from the predetermined viewing angle based on the information on the relative location. When it is identified that the user deviates from the predetermined viewing angle, the electronic device 100 may perform a keystone function of the electronic device based on the second location information on the location of the user 300.

As an example, the predetermined viewing angle may be set in various manners such as a horizontal viewing angle of 90 degrees (each of left and right angles is 45 degrees), a horizontal viewing angle of 60 degrees (each of left and right angles is 30 degrees), a horizontal viewing angle of 120 degrees (each of left and right angles is 60 degrees), and a horizontal viewing angle of 160 degrees (each of left and right angles is 80 degrees), and may be set by the user or be set at the time of manufacturing the electronic device 100. As an example, when it is identified that the user deviates from the predetermined viewing angle, the electronic device 100 may perform the keystone function to correspond to the location of the user.

Referring to FIG. 9, because the user 300 deviates from the predetermined viewing angle with respect to the projection area 10 and is located on the right side with respect to the projection area 10, the electronic device 100 may perform the keystone function so that a size of a right portion of a projected image is smaller than that of a left portion of the projected image.

In addition, as an embodiment, the degree of the keystone correction may also be adjusted depending on the degree at which the user 300 deviates from the predetermined viewing angle with respect to the projection area 10. For example, the degree of the keystone correction when the user 300 is located between the viewing angle of 60 to 90 degrees from the projection area 10 may be lower than the degree of keystone correction when the user 300 is located between the viewing angle of 90 to 120 degrees.

Figure 10:
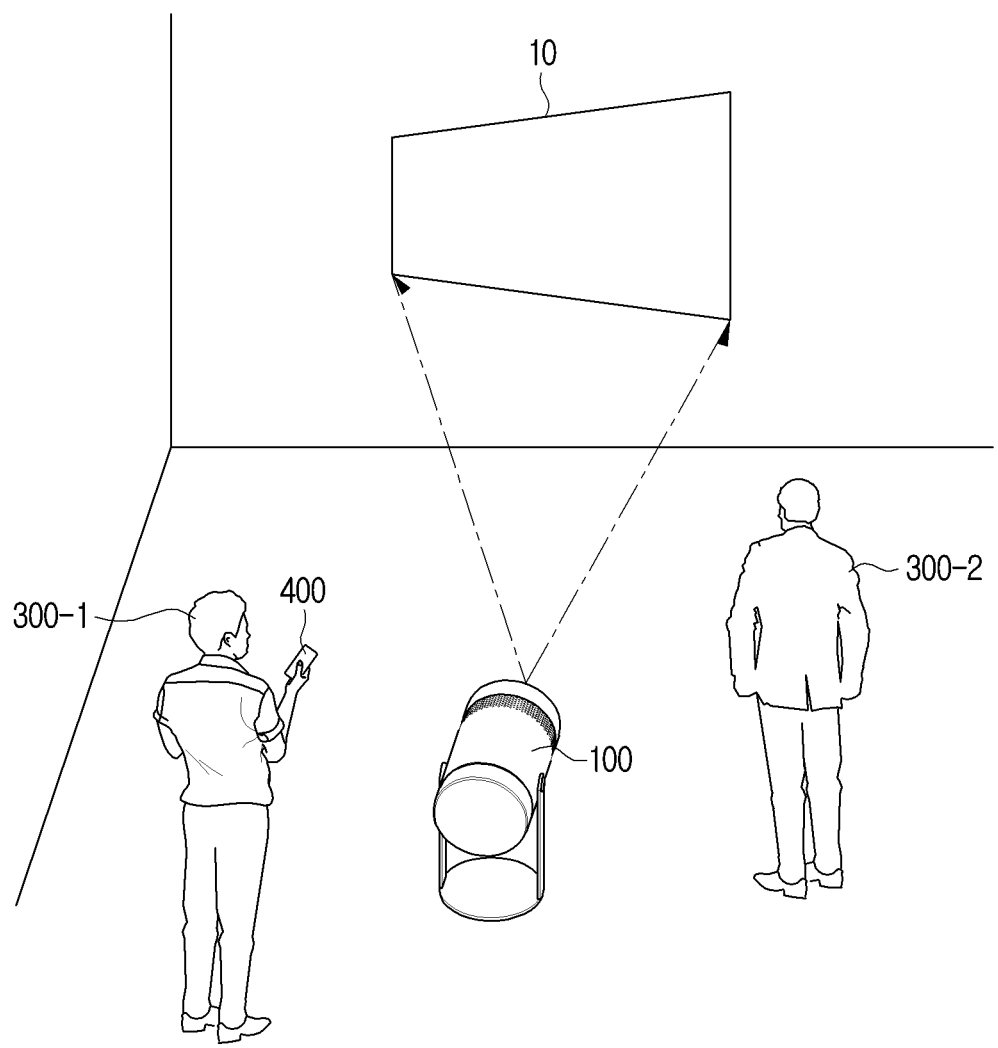
FIG. 10 is a view illustrating an embodiment of performing an operation corresponding to image quality processing when the number of users is plural according to the disclosure.

FIG. 10 is a view illustrating an embodiment of performing an operation corresponding to image quality processing when the number of users is plural according to the disclosure.

When it is identified that the number of users detected through the sensor is plural, the electronic device 100 may perform an operation corresponding to image quality processing based on second location information of each of the plurality of users. As an embodiment, the electronic device 100 may perform the operation corresponding to the image quality processing based on an average value of distances between the electronic device 100 and each of the plurality of users.

As an embodiment, the electronic device 100 may perform the operation corresponding to the image quality processing based on an average value of a distance between the projection area 10 and a first user 300-1 and a distance between the projection area 10 and a second user 300-2, based on second location information on the electronic device 100 and the first user 300-1, second location information on the electronic device 100 and the second user 300-2, and first location information on the electronic device 100 and the projection area 10.

However, the disclosure is not limited thereto, and even though it is identified that the number of users is plural, the electronic device 100 may perform the operation corresponding to the image quality processing based on a location of the first user 300-1 close to the external device 400.

Figure 11A:
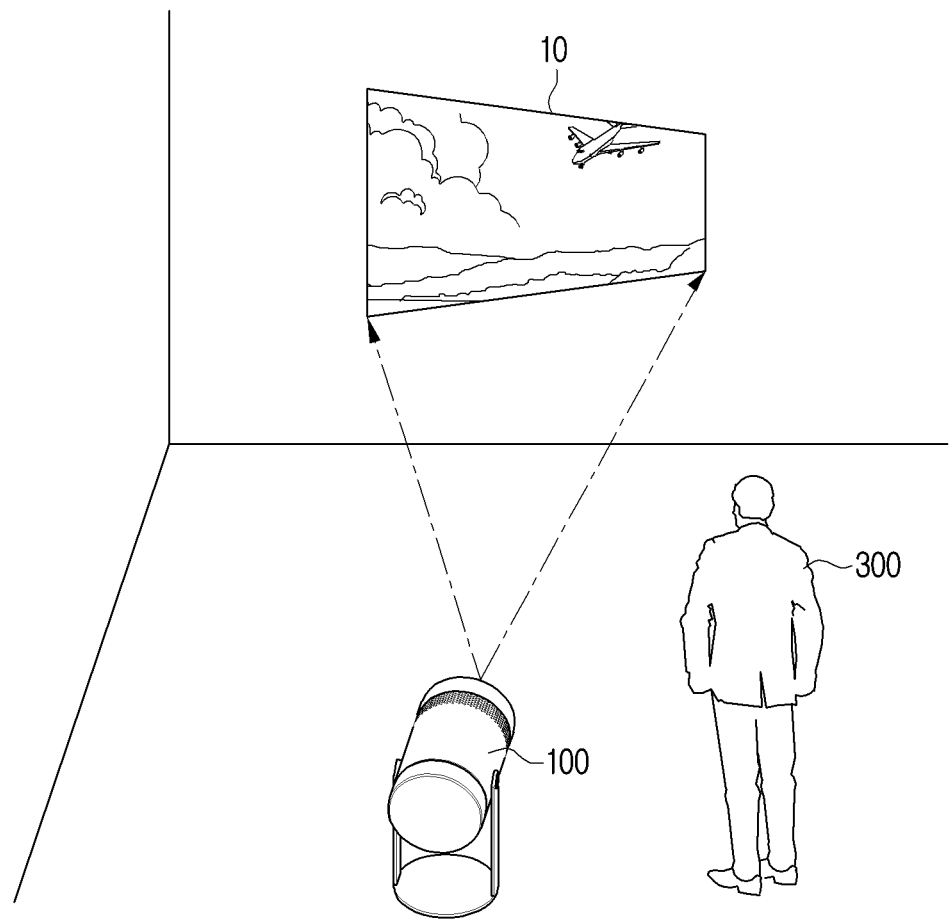
FIG. 11A is a view illustrating an embodiment of performing different keystone corrections while providing different images according to the location of the user, according to an embodiment of the disclosure.

FIG. 11A is a view illustrating an embodiment of performing different keystone functions while providing different images according to the location of the user, according to an embodiment of the disclosure.

Figure 11B:
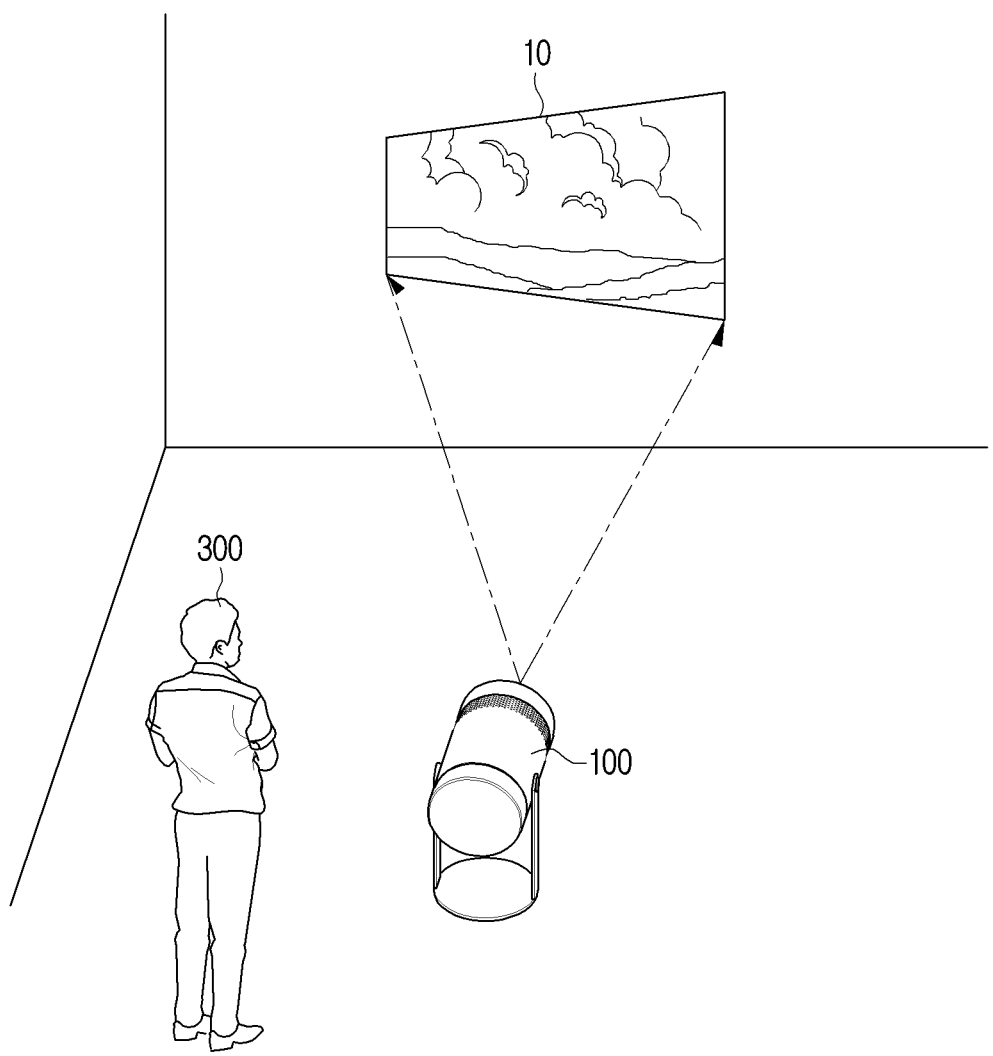
FIG. 11B is a view illustrating an embodiment of performing different keystone corrections while providing different images according to the location of the user, according to an embodiment of the disclosure.

FIG. 11B is a view illustrating an embodiment of performing different keystone functions while providing different images according to the location of the user, according to an embodiment of the disclosure.

The electronic device 100 may provide different images according to a location of the user 300 based on second location information on the user 300 acquired through a sensor. As an example, when it is identified that the user 300 is located on the right side with the projection area 10, the electronic device 100 may provide an image as viewed from the right side as illustrated in FIG. 11A. In addition, when it is identified that the user 300 is located on the left side with the projection area 10, the electronic device 100 may provide an image as viewed from the left side as illustrated in FIG. 11B.

As an embodiment, the electronic device 100 may acquire motion information of the user 300 through a sensor and provide an image corresponding to motion of the user 300.

As an embodiment, the electronic device 100 may perform a keystone function corresponding to the location of the user 300 while providing different images according to the location of the user 300. That is, when the user 300 is located on the right side of the projection area 10 as illustrated in FIG. 11A, the electronic device 100 may perform a keystone function so that a size of a left portion of a projected image of the projection area 10 is smaller than that of a right portion of the projected image. In addition, when the user 300 is located on the left side of the projection area 10 as illustrated in FIG. 11B, the electronic device 100 may perform a keystone function so that a size of a right portion of a projected image of the projection area 10 is smaller than that of a left portion of the projected image.

It has been described in FIGS. 11A and 11B to perform the keystone function while providing different images according to the location of the user 300, but the disclosure is not limited thereto. That is, the electronic device 100 may provide only different images without performing the keystone function according to the location of the user 300. In addition, the electronic device 100 may perform only the keystone function according to the location of the user 300 while providing the same image.

Figure 12A:
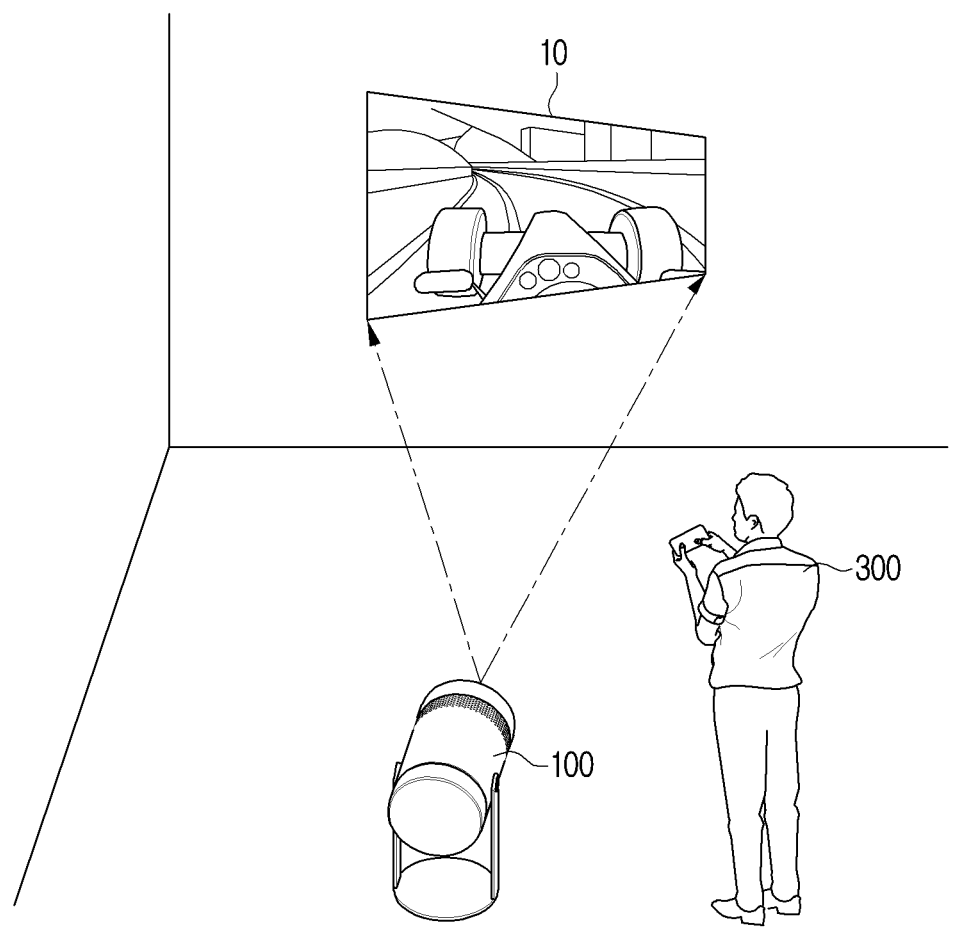
FIG. 12A is a view illustrating an embodiment of performing an operation corresponding to image quality processing according to an image according to the disclosure.

FIG. 12A is a view illustrating an embodiment of performing an operation corresponding to image quality processing according to an image according to the disclosure.

Figure 12B:
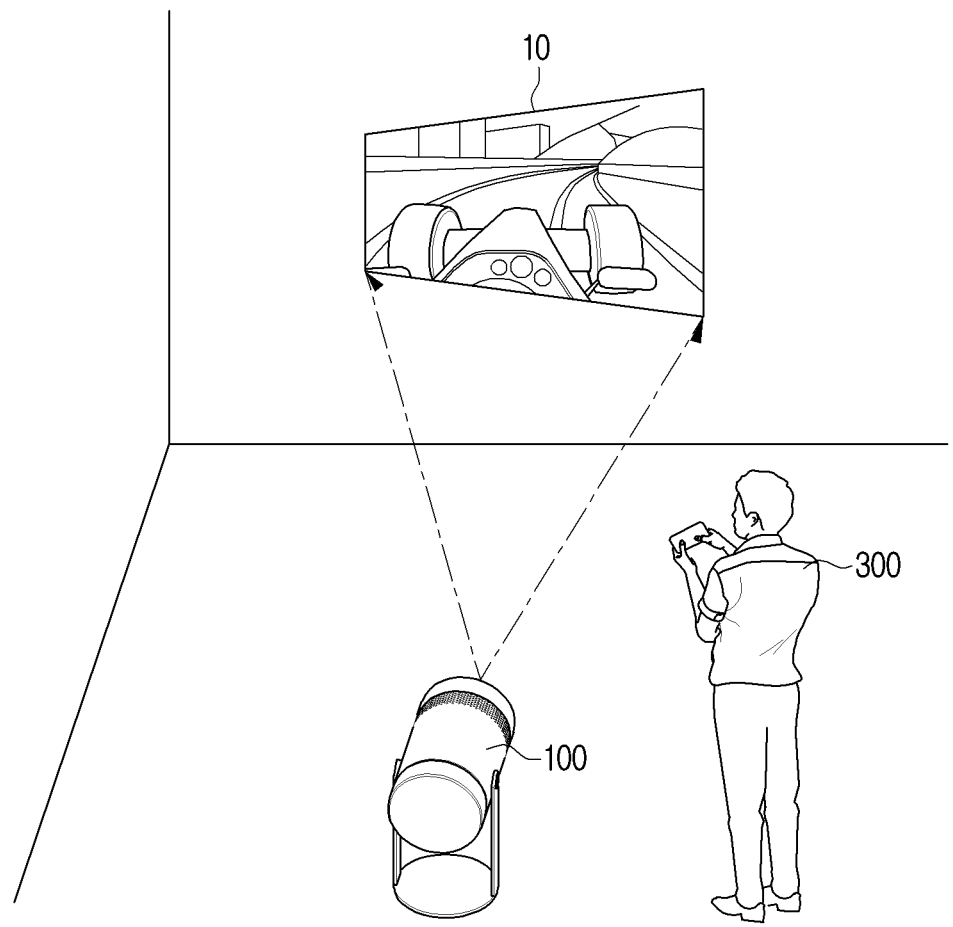
FIG. 12B is a view illustrating an embodiment of performing an operation corresponding to image quality processing according to an image according to the disclosure.

FIG. 12B is a view illustrating an embodiment of performing an operation corresponding to image quality processing according to an image according to the disclosure.

As an embodiment, the electronic device 100 may perform a keystone function according to an image projected on the projection area 10. When the electronic device 100 enters a game mode, the electronic device 100 may perform an operation corresponding to image quality processing according to the projected image. That is, when a racing game image is displayed on the projection area 10 as illustrated in FIGS. 12A and 12B, the electronic device 100 may perform a keystone function according to the racing game image. That is, when a vehicle in the racing game image moves to the left as illustrated in FIG. 12A, the electronic device 100 may perform the keystone function so that a size of a right portion of the projected image of the projection area 10 is smaller than that of a left portion of the projected image. In addition, when a vehicle in the racing game image moves to the right as illustrated in FIG. 12B, the electronic device 100 may perform the keystone function so that a size of a left portion of the projected image of the projection area 10 is smaller than that of a right portion of the projected image.

As an embodiment, the electronic device 100 may perform the keystone function based on an external device (e.g., a game console) for playing a game. When the electronic device 100 enters the game mode, the electronic device 100 may receive inclination information of the external device based on a gyro sensor installed in the external device, and may perform the keystone function based on the inclination information. As an example, when the electronic device 100 receives inclination information rotating in a clockwise direction from the external device, the electronic device 100 may perform the keystone function so that a size of a left portion of the projected image of the projection area 10 is smaller than that of a right portion of the projected image, as illustrated in FIG. 12B.

It has been described in the aforementioned embodiment that the electronic device 100 performs only the keystone function when the electronic device 100 enters the game mode, but the disclosure is not limited thereto, and the electronic device 100 may perform an operation of changing a screen size to correspond to the game mode and an operation of changing resolution and a frame to correspond to the game mode.

As an example, in a case of a racing game, the electronic device 100 may perform an operation of changing a screen size to an aspect ratio in which a horizontal length is greater than a vertical length as compared with an existing screen size. In addition, in a case of a dance game, the electronic device 100 may perform an operation of changing a screen size to an aspect ratio in which a vertical length is greater than a horizontal length as compared with an existing screen size.

As an example, in a case of a game requiring an image of high frames, such as a first-person shooter (FPS) game, the electronic device 100 may perform an operation of increasing frames of the image while lowering resolution of the image.

As an example, the electronic device 100 may adjust the resolution of the image and the frames of the image by further using location information and eyesight information of the user. That is, the electronic device 100 may identify the lowest resolution that may be lowered and identify the highest frames of the image that may be increased in consideration of the location information and the eyesight information of the user, and adjust the resolution of the image and the frames of the image.

Figure 13:
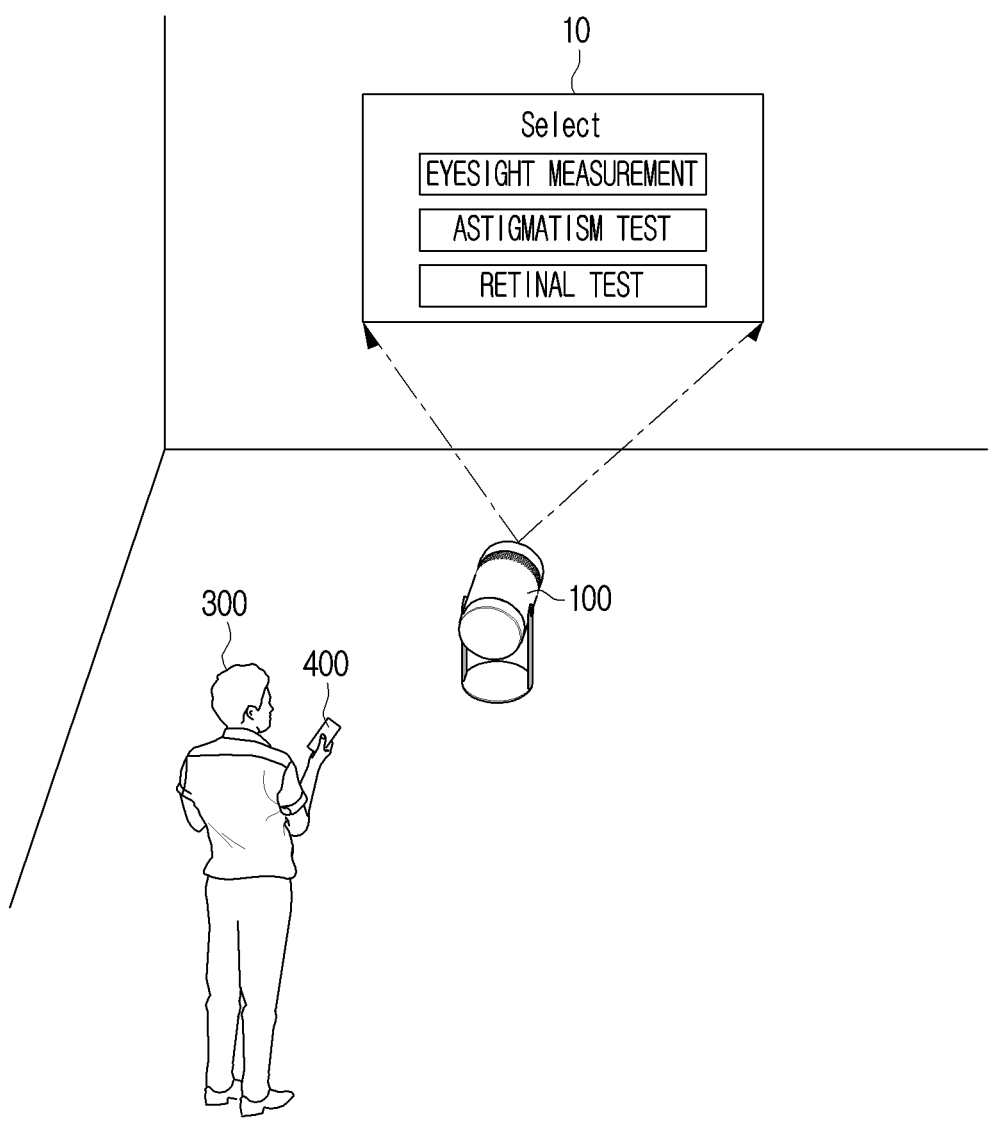
FIG. 13 is a view illustrating an embodiment of acquiring eyesight information of a user.

FIG. 13 is a view illustrating an embodiment of acquiring eyesight information of a user.

The electronic device 100 may project a UI image for acquiring eyesight information of the user 300 on the projection area 10 and acquire the eyesight information of the user 300 based on the UI.

As illustrated in FIG. 13, the electronic device 100 may project the UI image for acquiring the eyesight information of the user 300 on the projection area 10. As illustrated in FIG. 13, eyesight of the user 300 may be measured through the UI for acquiring the eyesight information of the user 300, a degree of astigmatism of the user 300 may be acquired, and a retinal test or the like may be performed. As an example, the user 300 may select icons in the UI for acquiring the eyesight information based on an input of the external device 400 to perform an eyesight test, and the electronic device 100 may acquire the eyesight information based on the eyesight test. In addition, the electronic device 100 may acquire and store the eyesight information corresponding to the user. In addition, the electronic device 100 may acquire second location information of the user through a sensor and store the eyesight information of the user corresponding to the location of the user.

In addition, the electronic device 100 may perform the operation corresponding to the image quality processing based on the eyesight information of the user 300. As an example, when it is identified that the user 300 is nearsighted, the electronic device 100 may perform an image correction for increasing sharpness of the image projected on the projection area 10. As an example, when it is identified that the user 300 is astigmatic, the electronic device 100 may perform an image correction for correcting the image projected on the projection area 10 to an image suitable for astigmatism. However, the disclosure is not limited thereto, and the electronic device 100 may perform an image correction by further using the location information of the user together with the eyesight information of the user 300.

Figure 14:
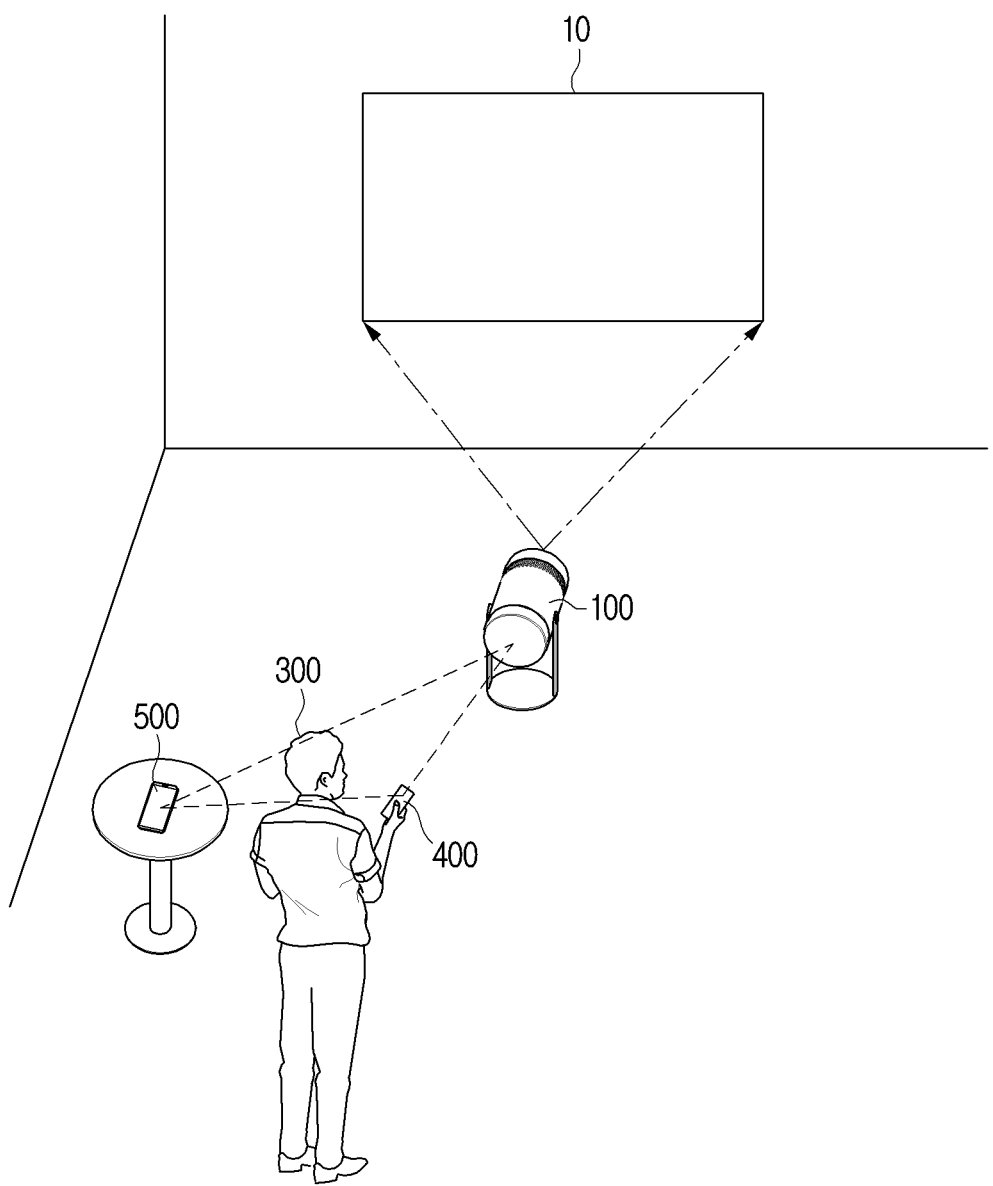
FIG. 14 is a view illustrating an embodiment of identifying a location of the user based on a plurality of devices according to an embodiment of the disclosure.

FIG. 14 is a view illustrating an embodiment of identifying a location of the user based on a plurality of devices according to an embodiment of the disclosure.

Referring to FIG. 14, the electronic device 100 may identify a location of the user using the external device 400 and a user terminal device 500. As an example, the external device 400 of FIG. 14 may be implemented as a remote control for controlling the electronic device 100, and the user terminal device 500 may be implemented as a smartphone of the user.

As an embodiment, the electronic device 100 may identify the location of the user based on location information received from the external device 400 for controlling the electronic device 100. That is, because the external device 400 is highly likely to be located near the user 300, the electronic device 100 may identify the location of the user 300 based on the location information on the external device 400.

As an embodiment, the electronic device 100 may acquire location information of the user terminal device 500 in a Bluetooth Low Energy (BLE) manner, and identify the location of the user 300 based on the acquired location information. That is, because the user terminal device 500 is highly likely to be located near the user 300, the electronic device 100 may identify the location of the user 300 based on the location information on the user terminal device 500.

As an embodiment, the electronic device 100 may identify the location of the user 300 based on the location information received from the external device 400 and the location information of the user terminal device 500. As an example, the electronic device 100 may identify an average value of the location information received from the external device 400 and the location information of the user terminal device 500 as the location of the user 300.

According to an embodiment, the electronic device 100 may identify the location of the user 300 based on voices of the user 300 received from a microphone of the electronic device 100, a microphone of the external device 400, and a microphone of the user terminal device 500, as illustrated in FIG. 14. Specifically, the electronic device 100 may identify the location of the user 300 by analyzing magnitudes and wavelengths of the voices of the user 300 received from the microphone of the electronic device 100, the microphone of the external device 400, and the microphone of the user terminal device 500. That is, the electronic device 100 may identify the location of the user 300 by identifying a device from which the voice of the user 300 is received at a relatively great magnitude among the electronic device 100, the external device 400, and the user terminal device 500 as a device close to the user 300.

Figure 15:
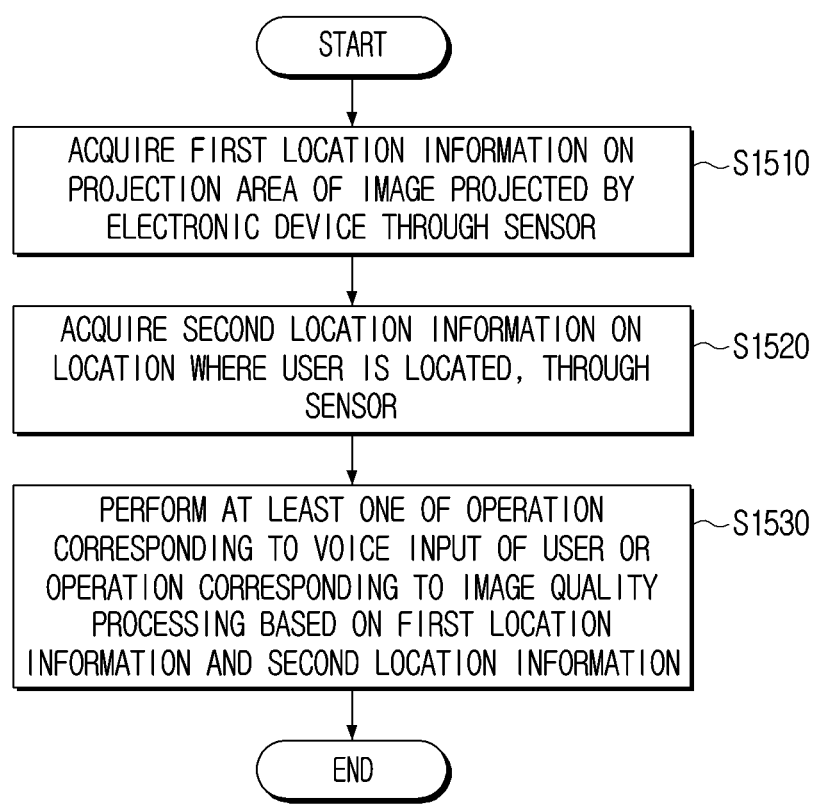
FIG. 15 is a flowchart for describing operations of an electronic device according to an embodiment of the disclosure.

FIG. 15 is a flowchart for describing operations of an electronic device according to an embodiment of the disclosure.

Referring to FIG. 15, the electronic device 100 may acquire first location information on a projection area of an image projected by the electronic device 100 through a sensor (S1510). As an embodiment, the electronic device 100 may acquire the first location information on the projection area of the image projected by the electronic device 100 through a ToF sensor. In addition, the first location information may include spatial information on the projection area and distance information on the projection area.

Then, the electronic device 100 may acquire second location information on a location where the user is located, through the sensor (S1520). As an embodiment, the electronic device 100 may acquire the second location information on the location where the user is located, using the ToF sensor. In addition, the second location information may include spatial information on the user, distance information on the user, and motion information on the user.

As an embodiment, the electronic device 100 may acquire the second location information by further using location information received from an external device for controlling the electronic device. Here, the external device may be implemented as at least one of a remote control or a user terminal device capable of communicating with the electronic device.

Then, the electronic device 100 may perform at least one of an operation corresponding to a voice input of the user or an operation corresponding to image quality processing based on the first location information and the second location information (S1530). The operation corresponding to the voice input of the user may include a first operation of performing pre-processing on the received voice of the user to perform an operation corresponding to the voice input of the user and a second operation of identifying a device that is to perform the operation corresponding to the voice input of the user among a plurality of devices in the premises. The operation corresponding to the image quality processing may include an operation of performing a keystone function based on the location information of the user, an operation of correcting an image projected by the electronic device 100 based on the location information of the user, and an operation of adjusting a focus of the image projected by the electronic device 100 based on the location information of the user.

As an embodiment, the electronic device 100 may identify information on a relative location between the projection area, the electronic device, and the user based on the first location information and the second location information. In addition, the electronic device 100 may perform the operation corresponding to the voice input of the user based on the information on the relative location.

As an embodiment, the electronic device 100 may perform a first operation corresponding to the voice input of the user based on identifying that the user is located between the electronic device 100 and the projection area through the information on the relative location. As an example, when a voice of the user for performing a voice input function of the user is received, the electronic device 100 may perform pre-processing on the received voice to acquire voice information. In addition, the electronic device 100 may perform the operation corresponding to the voice input of the user based on the voice information.

As an embodiment, the electronic device 100 may perform a second operation corresponding to the voice input of the user based on identifying that the electronic device 100 is located between the user and the projection area through the information on the relative location. As an example, when a trigger voice input of the user for performing a voice recognition function is received, the electronic device 100 may perform a second operation of controlling the external device so that the external device for controlling the electronic device performs the operation corresponding to the voice input of the user. As an example, when the trigger voice input of the user for performing the voice recognition function is received, the electronic device 100 may identify a device that is to perform the operation corresponding to the voice input of the user, of the electronic device 100 and the external device, based on the second location information and the location information received from the external device for controlling the electronic device 100.

As an embodiment, when it is identified that the user deviates from a predetermined viewing angle with respect to the projection area, through the information on the relative location, the electronic device 100 may perform a keystone function.

As an embodiment, the electronic device 100 may acquire information on a distance between the projection area and the user based on the first location information and the second location information. In addition, the electronic device 100 may perform at least one of an operation of adjusting a focus of an image projected on the projection area or an operation of correcting the image based on the information on the distance.

Figure 16:
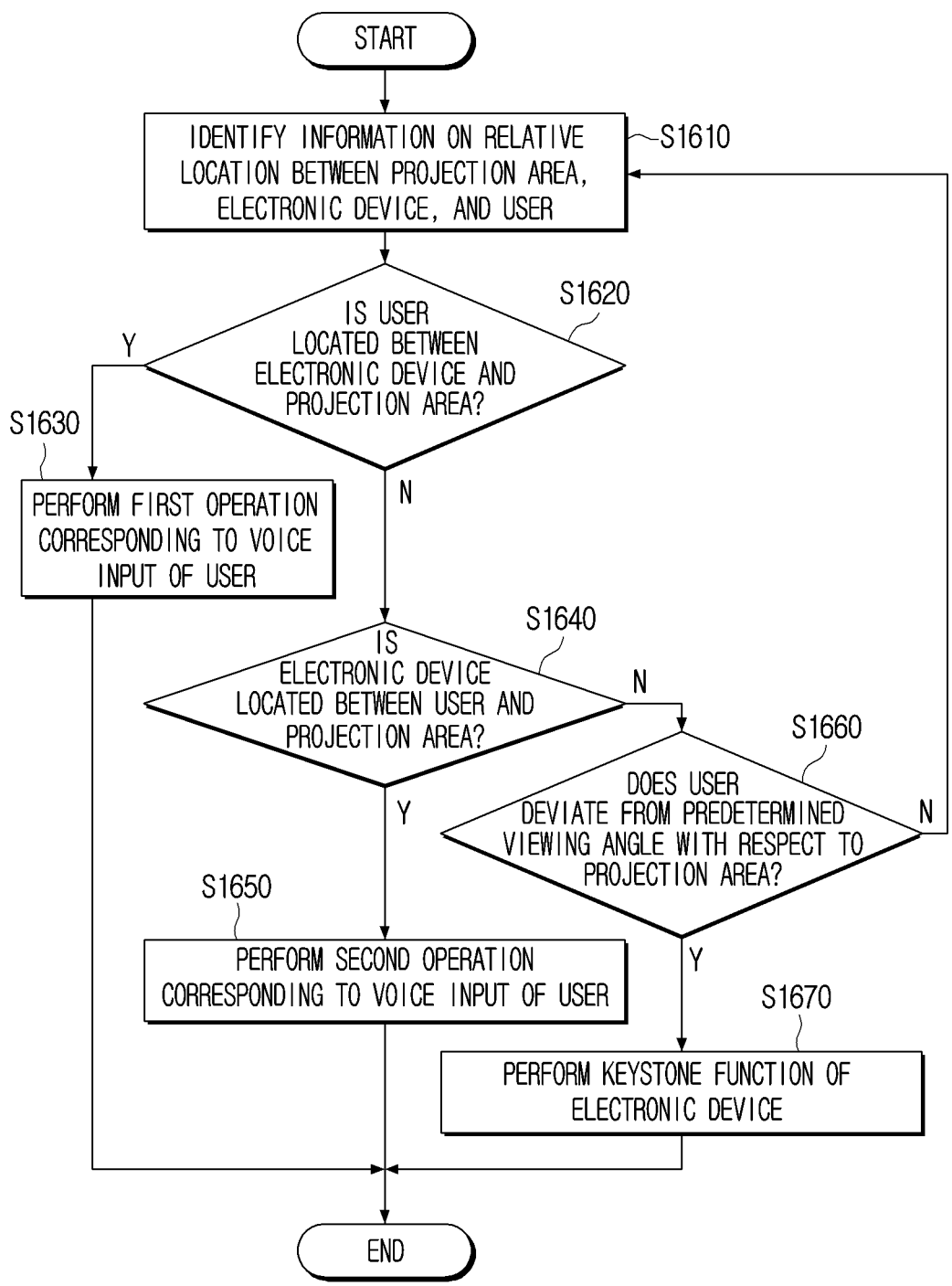
FIG. 16 is a flowchart for describing detailed operations of the electronic device according to an embodiment of the disclosure.

FIG. 16 is a flowchart for describing detailed operations of the electronic device according to an embodiment of the disclosure.

Referring to FIG. 16, the electronic device 100 may identify information on a relative location between the projection area, the electronic device 100, and the user (S1610). As an embodiment, the electronic device 100 may identify the information on the relative location between the projection area, the electronic device 100, and the user based on the first location information and the second location information.

Then, the electronic device 100 may identify whether or not the user is located between the electronic device and the projection area through the information on the relative location (S1620).

When it is identified that the user is located between the electronic device and the projection area (S1620—Y), the electronic device 100 may perform a first operation corresponding to a voice input of the user (S1630). The first operation may include a pre-processing operation of increasing voice recognition strength, a pre-processing operation of performing noise canceling to acquire voice information of the user, and a pre-processing operation of classifying a voice of the user based on whether or not scene change information of the image projected by the projection part 111 and the voice of the user are discrepant based on the scene change information.

When it is not identified that the user is located between the electronic device and the projection area (S1620—N), the electronic device 100 may identify whether or not the electronic device is located between the user and the projection area (S1640).

When it is identified that the electronic device is located between the user and the projection area (S1640—Y), the electronic device 100 may perform a second operation corresponding to the voice input of the user (S1650). As an example, the second operation may include an operation of controlling the external device so that the external device for controlling the electronic device 100 performs the operation corresponding to the voice input of the user when a trigger voice input of the user for performing a voice recognition function is received. In addition, the second operation may include an operation of identifying a device that is to perform the operation corresponding to the voice input of the user, of the electronic device 100 and the external device, based on the second location information and location information received from the external device for controlling the electronic device 100 when the trigger voice input of the user for performing the voice recognition function is received.

When it is not identified that the electronic device is located between the user and the projection area (S1640—N), the electronic device 100 may identify whether or not the user deviates from a predetermined viewing angle with respect to the projection area (S1660).

When it is identified that the user deviates from the predetermined viewing angle with respect to the projection area (S1660—Y), the electronic device 100 may perform a keystone function of the electronic device 100 (S1670). That is, when it is identified that the user deviates from the predetermined viewing angle with respect to the projection area (S1660—Y), the electronic device 100 may perform the keystone function as in an embodiment of FIG. 9.

When it is not identified that the user deviates from the predetermined viewing angle with respect to the projection area (S1660—N), the electronic device 100 may perform operation S1610 to repeatedly perform processes of FIG. 16.

Because the disclosure may be variously modified and have several embodiments, specific embodiments have been illustrated in the drawings and have been described in detail in a detailed description. However, it is to be understood that the disclosure is not limited to specific embodiments, but include various modifications, equivalents, and/or alternatives according to embodiments of the disclosure. Throughout the accompanying drawings, similar components will be denoted by similar reference numerals.

In describing the disclosure, when it is determined that a detailed description for the known functions or configurations related to the disclosure may unnecessarily obscure the gist of the disclosure, the detailed description therefor will be omitted.

In addition, the embodiments described above may be modified in several different forms, and the scope and spirit of the disclosure are not limited to the embodiments described above. Rather, these embodiments make the disclosure thorough and complete, and are provided to completely transfer a technical spirit of the disclosure to those skilled in the art.

Terms used in the disclosure are used only to describe specific embodiments rather than limiting the scope of the disclosure. Singular forms are intended to include plural forms unless the context clearly indicates otherwise.

In the disclosure, an expression "have", "may have", "include", or "may include" indicates existence of a corresponding feature (for example, a numerical value, a function, an operation, or a component such as a part), and does not exclude existence of an additional feature.

In the disclosure, an expression "A or B", "at least one of A and/or B", or "one or more of A and/or B", may include all possible combinations of items enumerated together. For example, "A or B", "at least one of A and B", or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component).

On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware.

Instead, in some situations, an expression "device configured to" may mean that the device may "do" together with other devices or components. For example, a phrase "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Meanwhile, various elements and regions in the drawings are schematically illustrated. Therefore, the spirit of the disclosure is not limited by relatively sizes or intervals illustrated in the accompanying drawings.

Meanwhile, the diverse embodiments described above may be implemented in a computer or a computer-readable recording medium using software, hardware, or a combination of software and hardware. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described in the specification may be implemented as the processor itself. According to a software implementation, embodiments such as procedures and functions described in the specification may be implemented as separate software modules. Each of the software modules may perform one or more functions and operations described in the specification.

Meanwhile, the methods according to the diverse embodiments of the disclosure described above may be stored in a non-transitory readable medium. The non-transitory readable medium may be mounted and used in various devices.

The non-transitory computer readable medium is not a medium that stores data for a while, such as a register, a cache, a memory, or the like, but means a medium that semi-permanently stores data and is readable by a device. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

According to an embodiment, the method according to the diverse embodiments disclosed in the disclosure may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., PlayStore™). In a case of the online distribution, at least portions of the computer program product may be at least temporarily stored in a storage medium such as a memory of a server of a manufacturer, a server of an application store, or a relay server or be temporarily created.

In addition, although embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications are to be understood to fall within the scope and spirit of the disclosure.

What is claimed is:

1. A control method of an electronic device, comprising:
   acquiring, through a sensor, first location information of a projection area of an image projected by the electronic device, the first location information being between the electronic device and the projection area;
   acquiring, through the sensor, second location information on a location of a user, the second location information being between the electronic device and the user;
   identifying information on a relative location between the projection area, the electronic device, and the user, based on the first location information and the second location information; and
   performing at least one of an operation corresponding to a voice input of the user based on the information on the relative location and an operation corresponding to image quality processing based on the first location information and the second location information.

2. The control method as claimed in claim 1, wherein the performing of the operation corresponding to the voice input of the user includes:
   performing a first operation corresponding to the voice input of the user based on identification of the user being located between the electronic device and the projection area according to the information on the relative location; and
   performing a second operation corresponding to the voice input of the user based on identification of the electronic device being located between the user and the projection area according to the information on the relative location.

3. The control method as claimed in claim 2, wherein the performing of the first operation includes:
   performing, based on the voice input of the user being received, pre-processing on the received voice input of the user to acquire voice information; and
   performing the operation corresponding to the voice input of the user based on the voice information.

4. The control method as claimed in claim 2, wherein the performing of the second operation includes controlling an external device configured to control the electronic device, so that the external device controls the electronic device to perform the operation corresponding to the voice input of the user, based on a trigger voice input of the user being received.

5. The control method as claimed in claim 2, wherein the performing of the second operation includes:

identifying one of the electronic device or an external device to perform the operation corresponding to the voice input of the user, based on the second location information and a third location information received from the external device, and a trigger voice input of the user being received, wherein the external device is configured to control the electronic device.

6. The control method as claimed in claim 1, further comprising identifying the user moving away from a predetermined view angle with respect to the projection area according to the information on the relative location, and performing a keystone function of the electronic device based on the user moving away from the predetermined viewing angle with respect to the projection area.

7. The control method as claimed in claim 1, further comprising:

acquiring information on a distance between the projection area and the user based on the first location information and the second location information; and performing at least one of an operation of adjusting a focus of an image projected on the projection area or an operation of correcting the image based on the information on the distance.

8. The control method as claimed in claim 1, wherein in the acquiring of the second location information, the second location information is acquired by using location information received from an external device configured to control the electronic device.

9. An electronic device comprising:

a projector configured to project an image;

a sensor;

a memory configured to store at least one instruction; and a processor configured to execute the at least one instruction stored in the memory to control the electronic device, wherein the processor is configured to:

acquire first location information of a projection area of the image projected by the projector through the sensor, the first location information being between the electronic device and the projection area;

acquire second location information of a location of a user, through the sensor, the second location information being between the electronic device and the user;

identify information on a relative location between the projection area, the electronic device, and the user based on the first location information and the second location information, and perform at least one of an operation corresponding to a voice input of the user based on the information on the relative location and an operation corresponding to image quality processing based on the first location information and the second location information.

10. The electronic device as claimed in claim 9, wherein the processor is configured to:

perform a first operation corresponding to the voice input of the user based on identification of the user being located between the electronic device and the projection area according to the information on the relative location, and perform a second operation corresponding to the voice input of the user based on identification of the electronic device being located between the user and the projection area according to the information on the relative location.

11. The electronic device as claimed in claim 10, wherein the processor is configured to:

perform, based on identification of the user being located between the electronic device and the projection area and the voice input of the user being received, pre-processing on the received voice input of the user to acquire voice information, and perform the operation corresponding to the voice input of the user based on the voice information.

12. The electronic device as claimed in claim 10, wherein the processor is configured to:

control an external device configured to control the electronic device so that the external device controls the electronic device to perform the operation corresponding to the voice input of the user, based on identification of the electronic device being located between the user and the projection area and a trigger voice input of the user being received.

13. The electronic device as claimed in claim 10, wherein the processor is configured to:

identify one of the electronic device or an external device to perform the operation corresponding to the voice input of the user, based on the second location information and a third location information received from the external device and a trigger voice input of the user being received.

* * * * *